(12) United States Patent
Serjeantson et al.

(10) Patent No.: US 7,860,872 B2
(45) Date of Patent: Dec. 28, 2010

(54) AUTOMATED MEDIA ANALYSIS AND DOCUMENT MANAGEMENT SYSTEM

(75) Inventors: Brett Serjeantson, Ottawa (CA); Paul Williamson, Ottawa (CA)

(73) Assignee: NIKIP Technology Ltd., Ottawa, Ontario (CA)

( * ) Notice: Subject to any disclaimer, the term of this patent is extended or adjusted under 35 U.S.C. 154(b) by 259 days.

(21) Appl. No.: 11/668,346

(22) Filed: Jan. 29, 2007

(65) Prior Publication Data
US 2008/0183710 A1 Jul. 31, 2008

(51) Int. Cl.
*G06F 17/30* (2006.01)
*G06F 17/21* (2006.01)

(52) U.S. Cl. .................. 707/755; 707/811; 707/917; 704/9

(58) Field of Classification Search ............ 707/917, 707/755, 811
See application file for complete search history.

(56) References Cited

U.S. PATENT DOCUMENTS

| | | | |
|---|---|---|---|
| 6,675,162 B1 | 1/2004 | Russell-Falla et al. | |
| 6,904,454 B2 | 6/2005 | Stickler | |
| 7,032,167 B1 | 4/2006 | Cleasby et al. | |
| 7,464,023 B2 * | 12/2008 | Parry et al. ............... | 704/9 |
| 2002/0138525 A1 * | 9/2002 | Karadimitriou et al. ..... | 707/530 |
| 2004/0059577 A1 * | 3/2004 | Pickering .................. | 704/260 |
| 2005/0251737 A1 * | 11/2005 | Kobayashi et al. .......... | 715/513 |
| 2006/0020596 A1 * | 1/2006 | Liu et al. .................. | 707/6 |
| 2006/0031114 A1 * | 2/2006 | Zommers .................... | 705/10 |
| 2006/0036461 A1 * | 2/2006 | Chuah et al. ................ | 705/1 |
| 2006/0235885 A1 * | 10/2006 | Steele et al. ............. | 707/104.1 |
| 2007/0050406 A1 | 3/2007 | Byers | |
| 2007/0203945 A1 | 8/2007 | Louw | |
| 2007/0239779 A1 | 10/2007 | Hugill et al. | |
| 2008/0091513 A1 * | 4/2008 | Waggoner ................... | 705/10 |

FOREIGN PATENT DOCUMENTS

| | | | |
|---|---|---|---|
| KR | 2002-0014026 | * | 2/2002 |
| WO | 2007101263 A2 | | 9/2007 |

OTHER PUBLICATIONS

Litt, Perl Regular Expressions, 2001, pp. 2-5.*
Perl 5.8 Documentation, pp. 1-21, 2004.*
University of Cambridge Dept. of Engineering Java Glossary, 2002, pp. 1-3.*
Moens, Journal of Documentation, Use of a Text Grammar for Generating Highlight Abstracts of Magazine Articles, vol. 56, No. 5, pp. 477-539, 2000.*

(Continued)

*Primary Examiner*—James Trujillo
*Assistant Examiner*—Albert Phillips
(74) *Attorney, Agent, or Firm*—Harter Secrest & Emery LLP; Stephen B. Salai, Esq.; Brian B. Shaw, Esq.

(57) ABSTRACT

A web-based media analysis system, consisting of automated media analysis and document management tools, which processes news articles by parsing the news contents or documents and assigning, relating, and extracting information from the news contents for media analysis and relationally storing them in at least one database. The system further comprises a toning engine for toning articles accurately, based on words, attributes and categories of the article, and optionally based on the author of the article, if applicable.

25 Claims, 19 Drawing Sheets

OTHER PUBLICATIONS

Balena, Extract all quoted strings with RegExp object, Jul. 7, 2001, pp. 1-3.*

IBM Dictionary of Computing, 10th Edition, 1994, p. 260.*

The Authoritative Dictionary of IEEE Standards Terms, 7th Edition, 2000, p. 410.*

David Michaelson and Toni Griffin: "A New Model for Media Content Analysis", Institute for Public Relations, 2005 (2005), pp. 1-13.

Hood, Juia: Measurement firms find market growth, dated Aug. 28, 2004 (1 page) http://www.biz360.com/articles/prweek82304.aspx.

Whitemore, Sam: Journalists Lag Spin Doctors on Web Analytics, dated Jan. 4, 2005 (3 pages) http://www.forbes.com/2005/01/04/cx_sw_0104whitmore.html.

Acitelli, Tom: PR Software: The hard facts about PR software, dated Jun. 21, 2004 (6 pages) file:///Users/brett/Desktop/legal/html/login.htm.

ASPnews.com Staff: Vocus Brings Home the Bacon's, dated Apr. 17, 2003 (4 pages) http://www.aspnews.com/news/alliances/article.php/2192791.

PR Newswire: Vocus, Inc. Expands International Presence; Central and Eastern European Office Strengthens Global Footprint, dated Jan. 29, 2004 (3 pages) file:///Users/brett/Desktop/legal/html/login.htm.

* cited by examiner

Figure 14

| | |
|---|---|
| Article | 31A |
| Caption | 31B |
| Summary | 31C |
| Content | 31D |
| Language | 31E |
| Author | 31F |
| Publisher | 31G |
| Stakeholder | 31H |
| Issue | 31I |
| Editor_Tone | 31J |
| Photo | 31K |
| Page | 31L |
| Circulation | 31M |
| Company_Flag | 31N |
| Brand_Flag | 31O |

| | |
|---|---|
| News_Num | 51 |
| Company_Num | 52 |
| Language | 53 |
| Tone | 54 |
| Toned_by | 55 |
| User | 56 |

| | |
|---|---|
| Word | 61 |
| Tone | 62 |
| Company_Num | 63 |
| Language | 65 |
| Frequency | 66 |

| Tone | 71 |
|---|---|
| Company_Num | 72 |
| Language | 73 |
| Word_Count | 75 |

| Attr_Num | 81 |
|---|---|
| Tone | 82 |
| Company_Num | 83 |
| Frequency | 84 |

80

AUTOMATED MEDIA ANALYSIS AND DOCUMENT MANAGEMENT SYSTEM

CROSS-REFERENCE TO RELATED APPLICATIONS

Not applicable.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

INCORPORATION-BY-REFERENCE OF MATERIAL SUBMITTED ON A COMPACT DISC

Not applicable.

BACKGROUND OF THE INVENTION

Field of the Invention

The present invention relates to an automated media analysis and document management system, which processes news articles by parsing the news contents or documents and assigning, relating, and extracting information from the news contents for media analysis and creating a greater understanding and consensus on trends and issues.

In the past, many organizations have manually analyzed media clippings and manually tracked publication and author tone by correlating that information with media content. Media analysis is primarily used to find trends, issues, and measure the effectiveness of media campaigns for Public Relations professionals.

Media clippings were generally categorized based on issue and filed for future use. More recently, companies have coded information manually in electronic form and saved the information to a database or automated electronic feeds into their databases for analysis or viewing. Information is usually sent via XML or specific data format from various content providers to aid in the transfer of data from one source to another. The feeds are static and not configurable by non-administrators. However, due to the vast amount of data fed daily from various content providers, it becomes almost impossible to manually analyze and tone the articles in a meaningful and specific way.

In order to minimize such labor-intensive work, some companies started automating the classification process so that information is categorized and automatically toned. The resultant solutions seek to combine detailed author and publication contact information with news information. However, these solutions have concentrated on media monitoring, and have not provided anything beyond simple analysis; moreover, they generally provide only a one-dimensional reference to an article or content. They cannot provide cross-references to other articles, or analysis that requires references to a plurality of articles or contents since they lack scalabilities to accommodate various styles and sources of the media, or to process and manage such vast amount of data. They further lack flexibility to accommodate such differences in styles and types of source media. Other companies have built algorithms and artificial intelligence to help tone sentiment in an article. However, sentiment is hard to verify without human intervention, thus these solutions have not alleviated the intensity of the analysis work itself.

Another issue for automating analysis tools is information overload. This happens when the system cannot distinguish essential data or information from unwanted data or information. Vast amount of data is imported into the system, thus if the system cannot filter out such unwanted data or information effectively and prudently from the media sources, then the system will become "polluted" with vast amounts of unwanted data and information. As a result, further human intervention or manually classifying and sorting processed information is required to produce proper and meaningful information, and, therefore, could lead to even more labor intensive work.

Also, due to the emergence of the Internet and new media such as blogs and podcasts, organizations are suffering from information overload because of the vast amount of information available. This creates too much diversity of thought and splinters an organization's view on trends and issues.

It is desirable to have a system that helps prevent information overload without sacrificing coverage, and yet encourages the discussions that help construct eventual consensus within an organization. It is further desirable that the system allows for information to be saved to profiles and pushed to subscribers or designated recipients listed in the system via email or podcast feeds, further promoting consensus.

DESCRIPTION OF RELATED ART INCLUDING INFORMATION DISCLOSED UNDER 37 CFR 1.97 AND 1.98

Not applicable.

BRIEF SUMMARY OF THE INVENTION

In the past, many organizations have manually analyzed media clippings and manually tracked publication and author tone by correlating that information with media content. Media analysis is primarily used to find trends, issues, and measure the effectiveness of media campaigns for Public Relations professionals.

Media clippings were generally categorized based on issue and filed for future use. More recently, companies have coded information manually in electronic form and saved the information to a database or automated electronic feeds into their databases for analysis or viewing. Information is usually sent via XML or specific data format from various content providers to aid in the transfer of data from one source to another. The feeds are static and not configurable by non-administrators. However, due to the vast amount of data fed daily from various content providers, it becomes almost impossible to manually analyze and tone the articles in a meaningful and specific way.

In order to minimize such labor-intensive work, some companies started automating the classification process so that information is categorized and automatically toned. The resultant solutions seek to combine detailed author and publication contact information with news information. However, these solutions have concentrated on media monitoring, and have not provided anything beyond simple analysis; moreover, they generally provide only a one-dimensional reference to an article or content. They cannot provide cross-references to other articles, or analysis that requires references to a plurality of articles or contents since they lack scalabilities to accommodate various styles and sources of the media, or to process and manage such vast amount of data.

They further lack flexibility to accommodate such differences in styles and types of source media. Other companies have built algorithms and artificial intelligence to help tone sentiment in an article. However, sentiment is hard to verify without human intervention, thus these solutions have not alleviated the intensity of the analysis work itself.

Another issue for automating analysis tools is information overload. This happens when the system cannot distinguish essential data or information from unwanted data or information. Vast amount of data is imported into the system, thus if the system cannot filter out such unwanted data or information effectively and prudently from the media sources, then the system will become "polluted" with vast amounts of unwanted data and information. As a result, further human intervention or manually classifying and sorting processed information is required to produce proper and meaningful information, and, therefore, could lead to even more labor intensive work.

Also, due to the emergence of the Internet and new media such as blogs and podcasts, organizations are suffering from information overload because of the vast amount of information available. This creates too much diversity of thought and splinters an organization's view on trends and issues.

It is desirable to have a system that helps prevent information overload without sacrificing coverage, and yet encourages the discussions that help construct eventual consensus within an organization. It is further desirable that the system allows for information to be saved to profiles and pushed to subscribers or designated recipients listed in the system via email or podcast feeds, further promoting consensus.

BRIEF DESCRIPTION OF THE SEVERAL VIEWS OF THE DRAWING(S)

The invention will now be described in more detail with reference to the accompanying drawings, in which:

FIG. 14 is a conceptual diagram, illustrating columns of a table, Content_Article;

FIG. 15 is a conceptual diagram, illustrating columns of a table, Company_Article_Link;

FIG. 16 is a conceptual diagram, illustrating columns of a table, Word_Freqs;

FIG. 17 is a conceptual diagram, illustrating columns of a table, Tones;

FIG. 18 is a conceptual diagram, illustrating columns of a table, AttrFreqs;

DETAILED DESCRIPTION OF THE INVENTION

Figure 1:
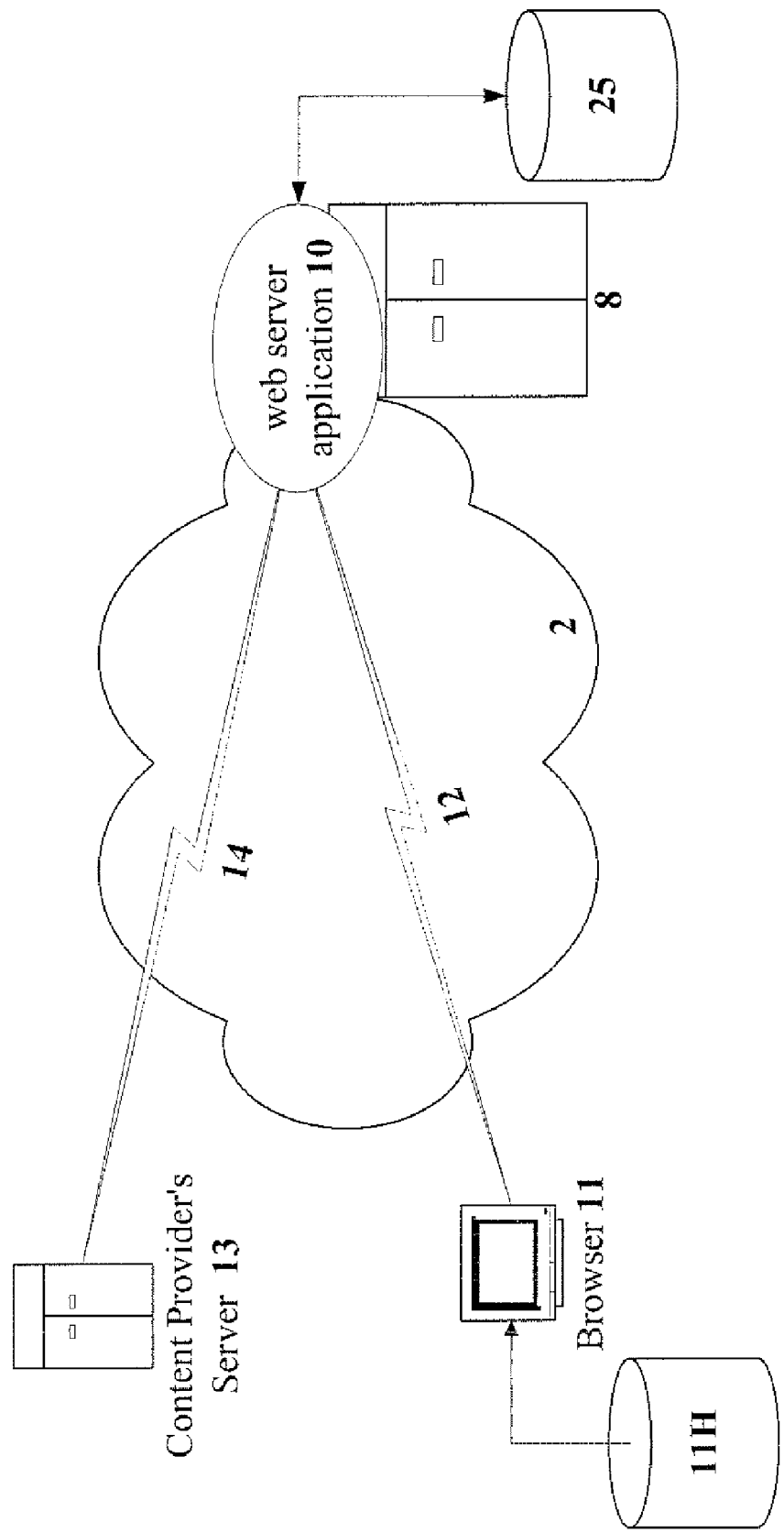
FIGS. 1 and 2 illustrate system overviews of a preferred embodiment of the present invention.
Figure 2:
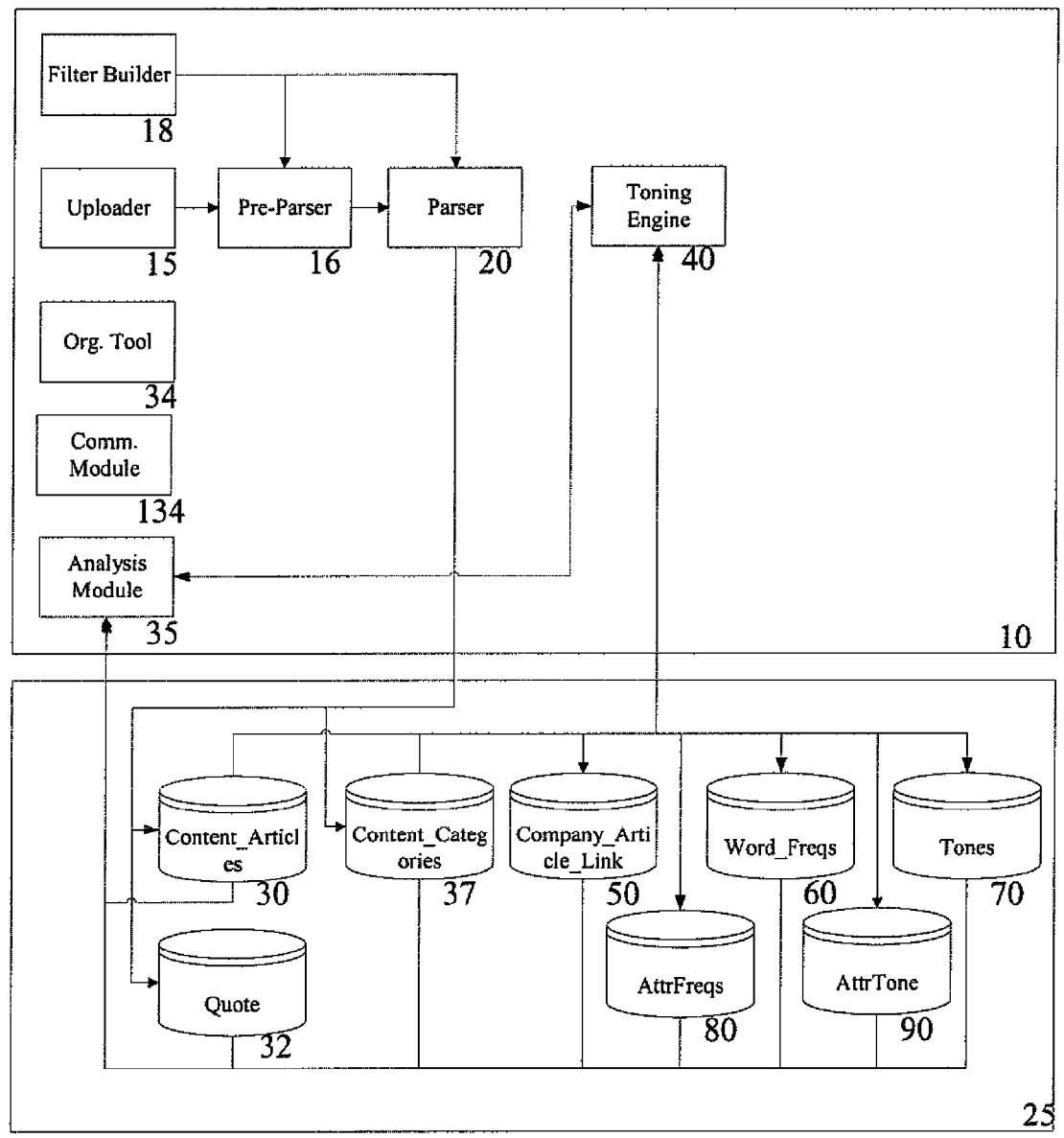

FIGS. 1 and 2 illustrate an overview of a preferred embodiment of the present invention, a web-based application system 10 on a server 8, that allows users to aggregate traditional print media, both TV and radio broadcast summaries, and web-based information such as blogs and Rich Site Summary (or RSS) feeds, comprising an uploader 15 for uploading a file(s) containing media content(s) from a client browser 11, such as a web browser (i.e. Internet Explore®, Netscape®, Firefox®) or client browsing application (i.e. iTunes®), via web session 12 or from at least one media content provider's server 13 via web service 14, a pre-parser 16 for converting the uploaded file(s) into a parsable file type, structure and format, a parser 20 for converting the pre-parsed file(s) into tokenized and serialized data and storing the data rationally in a database 25, and an analysis module 35 for analyzing the data stored in the database 25, including toning stories/articles using a toning engine 40, and for generating a report(s) to a user in response to a query. The database 25 is preferably a relational database comprising a plurality of tables for storing and organizing data.

Uploading Process

Figure 3:
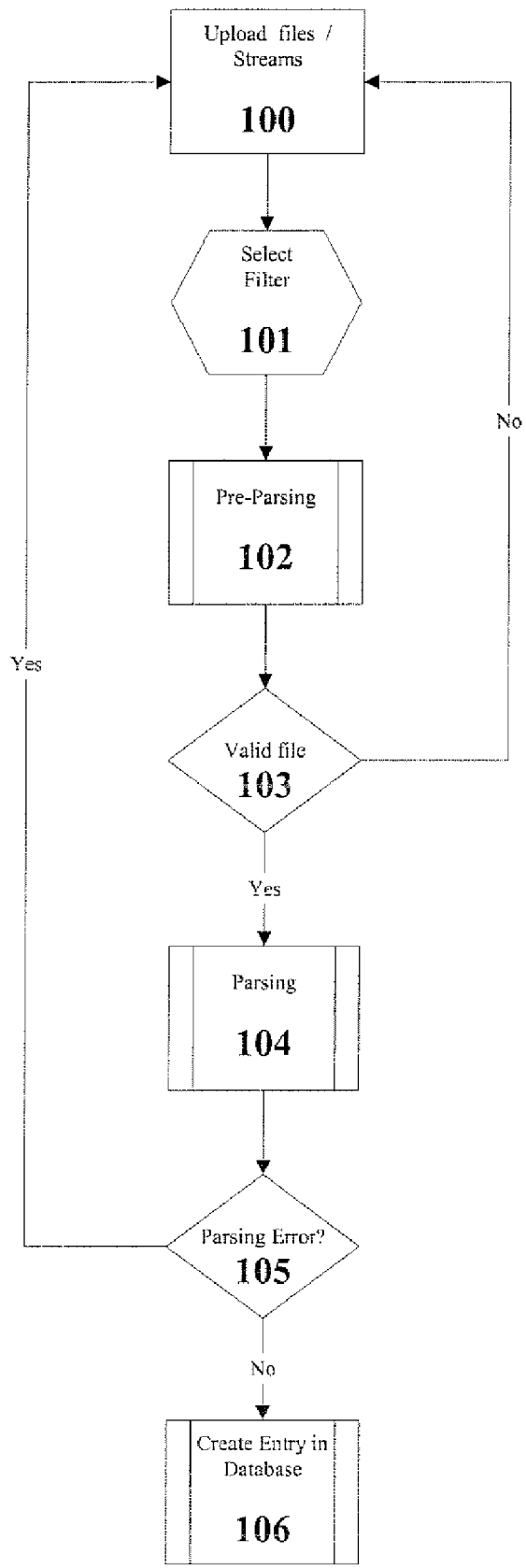
FIG. 3 is a process flow chart for uploading process of the preferred embodiment of the present invention.

Referring to FIGS. 1 to 3, a user may upload media content(s) from a client browser 11 via a web session 12 or from a media content provider's server 13 by arranging to have a web service 14 and to receive contents from the media content provider's server 13 automatically via a stream at step 100.

Uploading Media Contents Via Client Browser

In the case of uploading media contents using a client browser 11, the uploader 15 of the web server application 10 queries the user to specify the file type, content provider name and location where the file(s) is stored locally in a hard disk 11H on the user's personal computing device (such as personal computer, PDA) or remote device (not shown) accessible via a communication network 2. In the preferred embodiment of the present invention, the files are uploaded through the post method via Hypertext Transfer Protocol (or HTTP) from the client browser 11 to the web server application 10.

Uploading Media Contents Via Web Service

In the case of uploading media contents via web service 14, the uploader 15 of the web server application 10 is arranged to monitor the content provider's server 13 for any new media contents that can be uploaded to the web server application 10, and to initiate and to set up a web service 14 with the content provider's server 13 for receiving the new contents in a stream automatically.

Since each content provider uses a different application and template to release and distribute the content, it is essential to accommodate such differences. For example, the contents may be captured in one of various word processing file types: plain text, HTML, XML, Microsoft® Word® file, PDF, etc., or even image file such as JPEG, TIFF, GIF, etc. Even if two different content providers use the same file type, they likely use different templates or different ways of organizing data in the file. For example, tags used to indicate certain types of information in a story/article may differ from one content provider to another. Therefore, prior to processing any content and storing it in the database 25, it is important to select a proper pre-parsing filter at step 101, and pre-parse the content, at step 102, to reformat or convert the raw data into a standard format, or to have particular parsing rules to handle each file type and content provider combination.

The preferred embodiment of the present invention provides a pre-parser 16 for verifying the file type, converting the file into a common parsable file type and format, and, by using regular expressions with particular parsing rule(s) for that particular file type and content provider, pre-parsing the files or/and streams for rendering contents. Optionally, the pre-parser 16 automatically detects and verifies the file type and content provider by parsing the file/stream.

These parsing rules may be stored in a database (not shown) or any structured data storage means (not shown), such that it can be retrieved and applied to the pre-parser 16 for a particular file type/content provider combination. Alternatively, these parsing rules may be a code library retrievable from a structured data storage means (not shown), a database (not shown) or embedded within the pre-parser 16 of the web server application 10. Yet another alternative is to utilize a web server application's 10 integrated pre-parser 16, where such an option exists. In such cases, once the files are uploaded to the web server application 10, the parser 20 of the web server application 10 verifies the file type to make sure they are valid file type. Then, the parser 20 applies an appropriate code library to parse and assign meaning to the media contents directly without converting the uploaded data into a parsable file type and format.

Often, each file or stream may contain one or more separate contents (or stories), and each story may be separated based on the provider's unique content delimiters or tags in the file or stream. The filter or code library further comprises the content specific delimiters or tag information, so that the pre-parser 16 of the web server application 10 splits the file or stream into single stories/articles accordingly, and feeds each story/article to the parser 20.

Pre-Parsing—RSS Feed/XML Files

For example, in the case that a content provider utilizes RSS feeds or XML formatted files, the pre-parser 16 of the web server application 10 uses XML libraries for rendering the files. These XML libraries are customizable using a Filter Builder 18. The Filter Builder 18 is a tool that is accessible from any client browser 11 for defining XML tags and pre-parsing/parsing rules for the pre-parser 16 and parser 20, thus allows a user to develop customized filters for a particular content provider with corresponding to RSS or XML file information tags, and, further, corresponding to columns in the database 25. This is to allow users of the web server application 10 to quickly adapt to a new content provider's media content format without having to program/code filters for the pre-parser 16 and/or parser 20.

In a similar manner, libraries for other word processing files, such as plain text, Microsoft Word, PDF, etc., can be defined and customized for a particular content provider.

Pre-Parsing—MS Word

For example, Microsoft Word templates are formatted to a specific structure and pattern by each content provider, thus such templates can be characterized, and a specific library for pre-parsing and parsing the files from such content provider can be built using the filter builder 18, accordingly.

Pre-Parsing—PDF Files

In the case of PDF files, the PDF file META data and tags can be categorized to define and customized libraries in the similar manner to XML library by the user using the filter builder 18.

Pre-Parsing—Scanned Files

In the case of scanned image files, such as JPEG, GIF or TIFF, the pre-parser 16 converts the image file into a plain text file applying corresponding OCR engine (not shown). The converted text is pre-parsed, and then fed to the parser 20 of the web server application 10. Multiple scanned files can be uploaded into the web server application 10.

At step 103, once the file/stream is parsed, the pre-parser 16 verifies whether there is any error encountered during the process. If there is any error detected, the pre-parser 16 returns to the uploader 15 to re-upload the file or stream in order to correct the error, assuming that there is the error during uploading process.

Parsing—Interpreting and Storing Data

Once the uploaded file or stream is converted into parsable format and split into single stories/articles by the uploader 15 and the pre-parser 16 and no error is detected by the pre-parser 16 through the pre-parsing process, the parser 20 tokenizes each pre-parsed story/article by lines and/or by words by using regular expressions and Boolean keywords to parse and assign meaning to the parsed data for storing the data into the database 25 relationally at step 104. However, this process can result in unwanted data being stored in the database 25, which, in turn, could pollute the database 25. The parser 20 of the present invention comprises a list of unessential words/terms/expressions that the parser 20 shall ignore without losing contexts. The parser 20 further allows the user to vet information while parsing in order to accurately trim unessential data from the story/article thus only essential data will be saved in the database 25.

Finding Attributes of a Story

Figure 4:
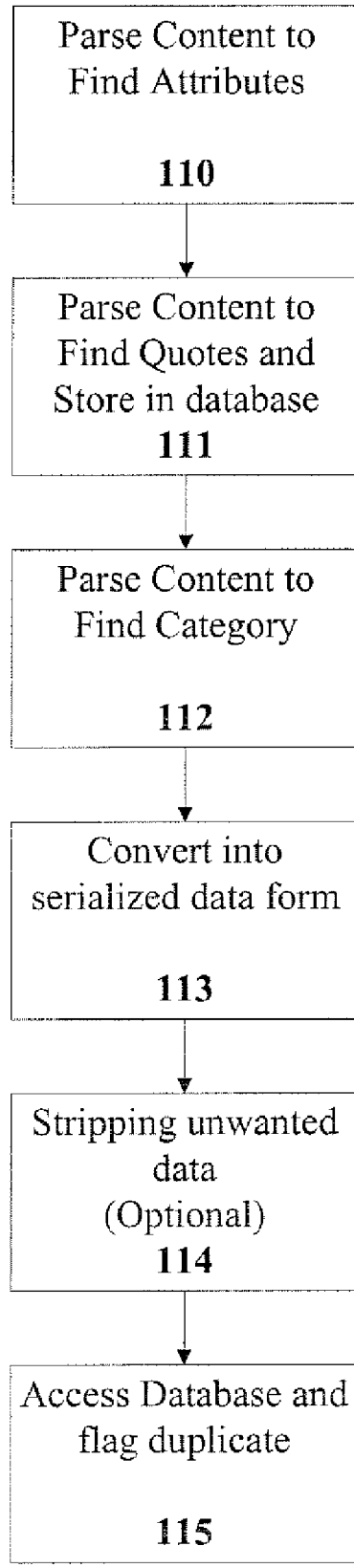
FIG. 4 is a process flow chart for parsing process of the preferred embodiment of the present invention.

Parsing process of step 104 comprises the sub-steps shown in FIG. 4. Each story/article is parsed by the parser 20 using regular expressions for finding common patterns in the story, stripping out unwanted data including unwanted character, tags, words, etc, and splitting and finding key information. At the step 110, the parser 20 identifies key information, including attributes to the author(s) of the story (or article), including, but not limited to, first, middle and last name, organization or individual's name, text case, multiple/single author(s), author title, e-mail address, etc.

The parser 20 finds author(s) by looking for words or terms such as "by," "byline," or any other equivalent indicators in the story using regular expressions. The parser 20 also finds author(s) by the placement (or relative location) in the story, depending on the type of file/content provider being uploaded from. Once the author(s) is found by the parser 20 in the story, then unwanted words and characters are removed by the parser 20.

Some of the stories may have an organization(s) or individual(s) as the author of the stories. In other words, a byline can be attributed to an organization instead of an individual author(s) or vice versa. Therefore, for example, by using regular expressions, news organizations such as AP, CP, REUTERS, etc can be identified as an organization author. By default, information is identified as an individual author.

The case for authors is switched to title case unless a word is an abbreviation or due to cultural formatting, such as Mc or Mac, periods or hyphenations. Case is switched using common POSIX functions such as token, strlen, and regular expressions.

Using regular expressions, the parser 20 also identifies first, last, and middle names. The parser 20 can also identify other common name patterns, such as last name first and title information. The parser 20 can also identify multiple authors or bylines in a story. The parser 20 further identifies the title of the author from the byline, and makes a record of the title separately from the author's name.

Once the author's name has been found in the story and the content of the story has been determined, regular expressions are used with the last name, first name, or any other indicator(s) to search in the file or the story for the author's email In fact, many articles are now being ended with an email address of the author. Thus, the parser 20 can identify the e-mail address of the author by using regular expressions to search for its unique formatting. Once the parser 20 finds the e-mail addressees), the parser 20 associates the e-mail address with the corresponding author.

The parser 20 further identifies other essential data in a story (or an article), including, but not limited to: headline, sub-headline, article type, content, publications, language, dates/times, captions, photo, and other document values. For example, the parser 20 identifies headlines by using regular expressions to search formatting tags or the position of the content in the document. Sub-headlines are found by using regular expressions to find formatting tags or the position of the content in the document.

The parser 20 determines and flags the article type of the story it is parsing by using regular expressions and internal logic to look for a certain pattern or keywords in the story. For example, if a story has start date and end date with time, the parser 20 assumes that the story is a broadcast document. If the parser 20 finds that there is column information, the parser 20 will flag the story as a column. Or, if the parser 20 finds that the story is from the editorial section based on the keywords therein, it can be flagged as a letter to the editor or an editorial, etc. By default, the parser 20 assumes that undetermined articles are news articles. The information regarding article type is important for the web server application 10, because it can determine how certain information is parsed and analyzed by the parser 20, analysis module 35 and/or communications module 134.

Even though there is comprehensive logic and a set of keywords for precisely detecting the article type of a story, the parser 20 may flag the story as a wrong article type. Therefore, the web server application 10 further provide tools (not shown) accessible from a client browser 11 for allowing users to access and revise the article type information at the time the parser 20 parsed or afterward.

The content is generally the last information found in a story. The parser 20 finds the content by using regular expressions to look for a certain formatting pattern(s) or the location of the content relative to the story being parsed.

The parser 20 identifies publications of the story by using regular expressions for evaluating the overall formatting of a certain publication name or the relative placement of the publication name, depending on the type of document being uploaded.

The parser 20 finds language of a story by examining the content using regular expressions and searching for definite articles, prepositions, and accents.

All stories must have a publication date. If a story is a broadcast summary or transcript, the story also includes the date and time for the publication of the story/article and the date and time for the broadcast of the story. The parser 20 detects these dates and times by a combination of relative placement within a story, keywords, and date and time functions. Once the dates and times are found, the parser 20 verifies whether the date and time are valid.

The parser 20 further determines whether there is any caption in the story/article, such as picture, figure, diagram, photo, etc, by using regular expressions to look for a certain set of keywords in the content of the story. Once a caption is found in the content of the story indicating a figure, picture or photo, the parser 20 makes a note for a figure, picture or photo associated with the story.

The parser 20 further identifies other attributes of a story, including, but not limited to, Page, Section, Column, Edition, Dateline, Source, Volume, Issue, Contact, Priority, Number of words in the story, Copyright Information, and Document Dividers. These attributes of the story/article are stored as article and publication profiles (not shown) in a Content_Article table 30 of the database 25. In the preferred embodiment of the present invention, the table, Content_Article 30, (reference to FIG. 14) of the database 25 comprises a plurality of columns, including, but not limited to, Article 31A, Caption, 31B, Summary 31C, Content 31D, Language 31E, Author 31F, Publisher 31G, Stakeholder 31H, Issue 31I, Editor_Tone 31J, Photo 31K, Page 31L, Circulation 31M, Company_Flag 31N and Brand_Flag 31O.

Finding Quotes

Figure 6:
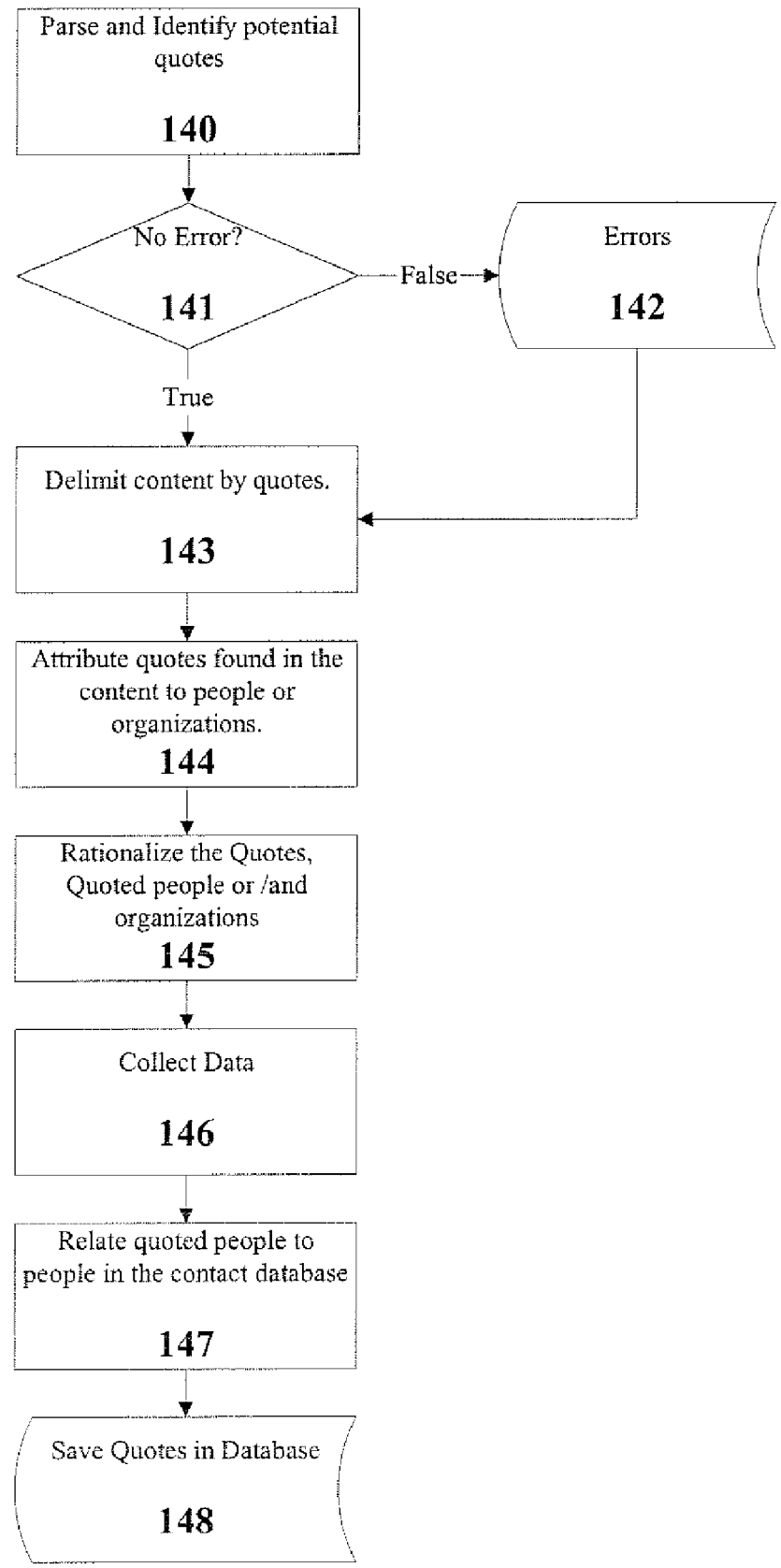
FIG. 6 is a process flow chart for quote finding process of the preferred embodiment of the present invention.

Once the parser 20 identifies all the attributes of the story/article and if the story/article is not a broadcast, then the parser 20 parses the content of the story to look for quotes used in the story at step 111. Every quote spotted by the parser 20 is attributed with the person being quoted, which is also identified by the parser 20 by using regular expressions. FIG. 6 illustrates process steps of how the parser 20 finds quotes and their attributes in a story.

First, at step 140, the parser 20 parses the content of a story by using regular expressions for identifying any quotation indicators for the beginnings and endings of quotes, i.e. quotation mark (""""), phrases (i.e. "xxxx said"), etc, which delimits the quotes. Any of these symbols or phrases indicates a start of a quote. Then, the parser 20 looks for an end of the quote, corresponding to the start just found. At step 141, if the parser 20 could not find the end of the quote, (i.e. in the case of quote mark, if end quotation mark was not found or total number of quotation marks in a story is not even (that means that there is at least one missing end quotation mark), then the parser 20 make a note of error in the content of the story/article at step 142, which would invite a human intervention to correct the error. Then, the parser 20 delimits all the quotes based on the quotation indicators, and serializes the delimited data and prepares them for further manipulation.

After delimiting the quotations at step 143, the parser 20 looks for attributes of the quotes in the story/article. The parser 20 further assumes that, if the order of content found in the serialized data is even numbered, then the data is considered a found quote; however, if the order of content found in the serialized data is odd numbered, the parser 20 assumes that the content could potentially contain quoted people or organizations. Then, at step 144, the parser 20 further searches for nouns, pronouns, and proper names in the content and associates those nouns, pronouns and proper names with common verbs used in journalistic styled writings. Based on the order of the verb or the type of noun, quotes can be attributed. For example, if the parser 20 finds a phrase "he [or she] said" after the quote, the name associated to the previous quote found in the story is attributed to the current quote being analyzed. The parser 20 also verifies the name's case using regular expressions by checking whether a proper title case format is used. If the parser 20 detects an error in the title case format, the parser 20 flags as a possible bad quote/ quoted person Once the parser 20 completes attributing all the quotes and people and/or organizations quoted in the story/ article, then the parser 20 rationalizes them, at step 145, prior to the collecting and saving of the data to the database 25. Then, all the quotes found in the story/article are serialized with all the attributes related to the quotes at step 146.

At step 147, quotes found in previously parsed stories/ articles, including, but not limited to, names of the persons being quoted, their quotes and other attributes, are relationally stored in the database 25, i.e. a quote table (or Quote) 32. Once the parser 20 has detected all the quotes, names and pronouns associated with the quotes in the content, the names and pronouns are rationalized together, so that all of the pronouns are resolved and associated with the names prior to saving the data to the database 25. The parser 20 makes sure that there is no duplicate instance of names for the same story being saved to the database 25. For example, if quotes are attributed to Mr. Brown, Joe Brown, or J. Brown, they will be attributed to Joe Brown through the serialization and rationalization of the data. If the parser 20 detects a contact in the content, then the parser queries the database 25 to verify whether the contact has already been saved in the database 25. If the parser 20 finds a match in the database 25, the parser 20 assumes that the quote found in the content is related the contact found in the database 25. The parser 20 makes a record of such relationship, so that, when the quote and quoted person is viewed, corresponding contact information can be quickly retrieved from the database 25.

Data Model

Once the parser 20 completes the aforementioned quote finding process steps 140 to 147, the information associated with the quotes found in the story are saved relationally in the table, Quote 32, in the database 25 at step 148.

Once an entry in the database 25 has been created for the story/article, the reference for the story/article can be related with an entry for the quoted person or organization. All the quotes for the identified quoted person or group can be related once the quotes have been saved in the database 25. Quoted persons can also be related with detailed contact information.

Quote Organizational Tool

Referring back to FIG. 2, once data has been saved to the database 25, the content, quotes, and quoted individuals or groups can be revised manually to provide more accurate information via a client browser 11 utilizing an organizational tool 34. If an error is recorded in the database 25, users of the system can adjust the content to add any missing information in the database 25 to complement the process by the parser 20.

If the quoted person has been flagged with an error or warning indicating, for example, that a quote has been wrongly attributed to a person or organization, the user can change the quoted person or organization via the organizational tool 34. Furthermore, if the parser 20 missed identifying any quote, the user can add the missed quote manually via the organizational tool 34. The user can also relate or unrelate any quoted individuals to detailed contact information via the organizational tool 34.

Finding Categories

Determining categories and sub-categories of the story/ article is essential, as categories and sub-categories are used to track issues, aid with competitive analysis, and help arrange information. Categories are arranged into parent and sub-categories Referring back to FIG. 4, once quotes are found at step 111, then at step 112, the parser 20 determines which categories and subcategories (based on Boolean keywords, which have predetermined attributes to predefined categories/subcategories), exist in the story/article, and assigns meaning to the categories and subcategories by using regular expressions. Using the Boolean keywords that have been assigned to the category or subcategories, a detailed regular expression is created. Each regular expression is looped through the content while the content is parsed and, if the regular expression for the category or subcategory is found, the category or subcategory is assigned to the story/ article. The Boolean keywords can also be used to create a full-text search for the database 25, so categories and subcategories can be assigned to the story/article after the upload process.

At step 113, the parser 20 converts the story/article into serialized data form such that all the attributes, quotes, category and the content of the story/article are in a uniform structure. At step 114, the parser 20 further strips out all the unwanted data, i.e. words, terms and/or expressions in the content of the story/article. Optionally, the parser 20 may filter out unwanted data prior to step 110, step 111, step 112, or step 113. Further optionally, the parser 20 may filter out unwanted data gradually through the steps 110 to 113. Then, at step 115, the parser 20 search for any duplicate data based on the attributes of the story/article. If the parser 20 finds any duplicate in the database 25, then the parser 20 makes a note of said duplicate for further processing.

Referring back to FIG. 3, once the parser 20 completes the step 104, then the web server application 10 of the present invention checks whether there is any parsing error at step 105. If there is any error, the web server application 10 returns to step 100 to re-initiate the uploading process, however, if there is no error, and if there is no duplicate, the data generated during the parsing process at step 104 is saved relationally to the database 25 at step 106, so that the data are optimized for searching and analysis at a later stage.

Publication Information

Figure 5:
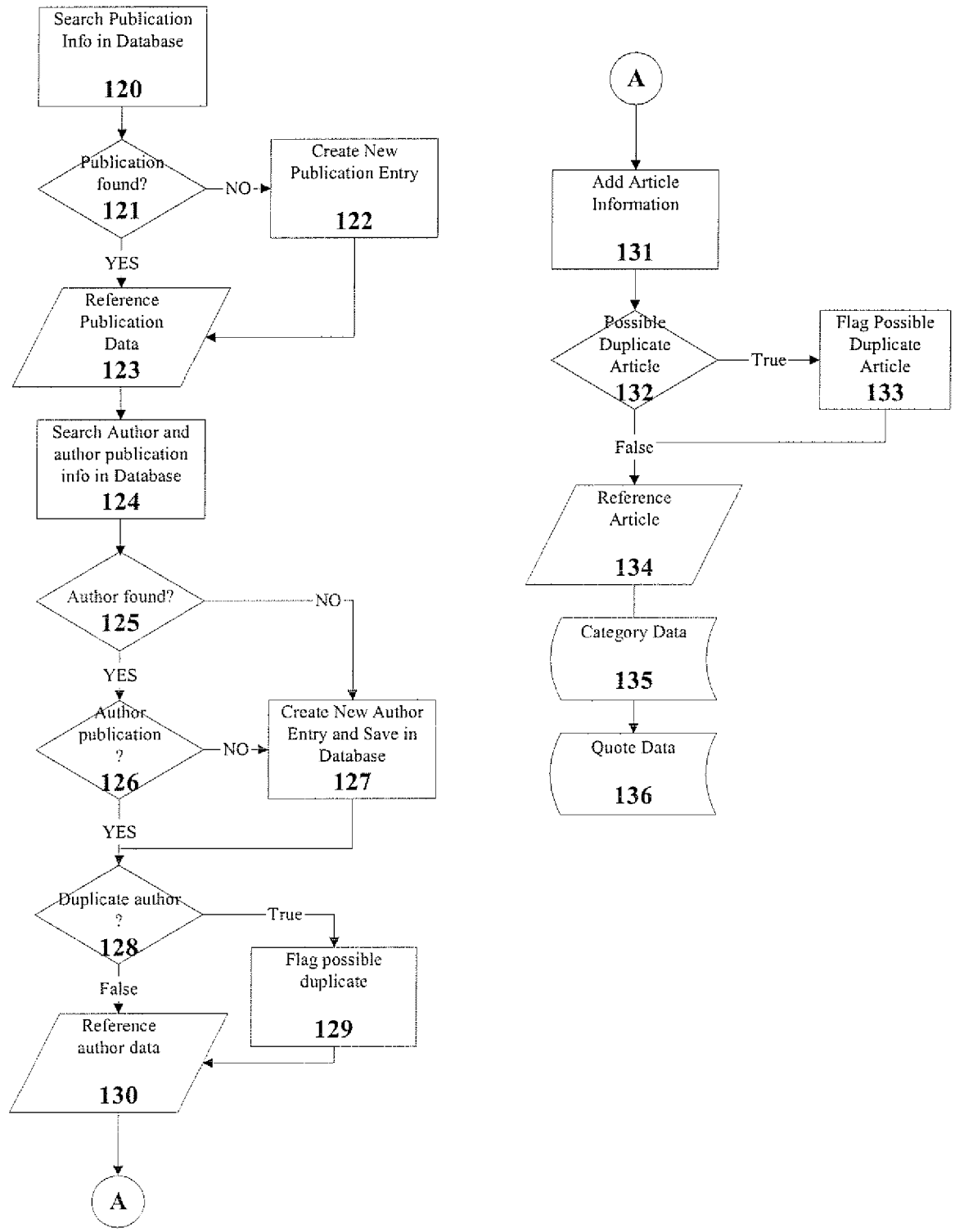
FIG. 5 illustrates the detailed sub-steps of step 106 of FIG. 3.

FIG. 5 illustrates the detailed sub-steps of step 106 of FIG. 3.

At step 120, the publication name or the aliases of the publication name of the story/article is searched in the database 25. At step 121, if the name is found, then, at step 123, the web server application 10 references the publication entry found in the database 25 to the story/article after the article/ document has been saved in the database 25. If the name was not found at step 121, a new publication entry is created at step 122 and the new publication entry is referenced to the article/document after the article/document has been saved in the database 25.

Author Information

At step 124, the web server application 10 searches the author and publication reference in the database 25. If the author and publication is found in the database 25 at steps 125 and 126 respectively, then the author entry found in the database 25 is referenced to the story/article after the story/article has been saved to the database 25. If the author or publication was not found at steps 125 and 126 respectively, the web server application 10 creates a new author entry in the database 25 at step 127 and the newly created author entry will be referenced to the story/article after the story/article has been saved in the database 25. If any duplicate author is found (i.e. there is the author entry found in the database 25 but the publication is not found in the database 25) at step 128, then the author is flagged as a possible duplicate at step 129. Regardless of a possible duplicate author, the data is referenced to the article/document at step 130 after the article/document has been saved in the database 25.

Article Information

The web server application 10 saves the article information and references from the publication and authors in the database 25 at the step 131. The reference to the article information is retrieved to associate the authors, the categories, and the quote information, and the web server application 10 checks whether there is any duplicate story/article at step 132. If the web server application 10 detects the possible duplication of the article in the database 25, then, at the step 133, the web server application 10 makes a note of said duplication as a flag for further process at a later stage.

Categories

At step 135, the web server application 10 stores the category information found by the parser 20 in the database 25, including category references and the story/article reference is saved to the database 25.

Quotes

At the step 136, the web server application 10 stores the quotes and quoted references and the reference to the story/article in the database Analysis Now, referring back to FIG. 2, the web server application 10 further comprises an analysis module 35 accessible from a client browser 11 for receiving requests for search queries from a user, initiating those searches in the database 25 for analyzing the data, and building a report to be sent back to and displayed on the client browser 11. The interface is an HTML formatted web page that allows users to create search queries. Data in the database 25 can be searched by full-text search on the content, date, categories, publication, author, etc. Once the stories that match query criteria are found, the attributes of the stories, i.e. headlines, summaries, publication, etc. are gathered and rendered to a displayable page, showing the attributes on the client browser 11. This information can be sorted in order by date or relevance. The information is broken up into a plurality of manageable, displayable pages For example, no more than 20 items are displayed and users can jump or toggle through pages.

Figure 7:
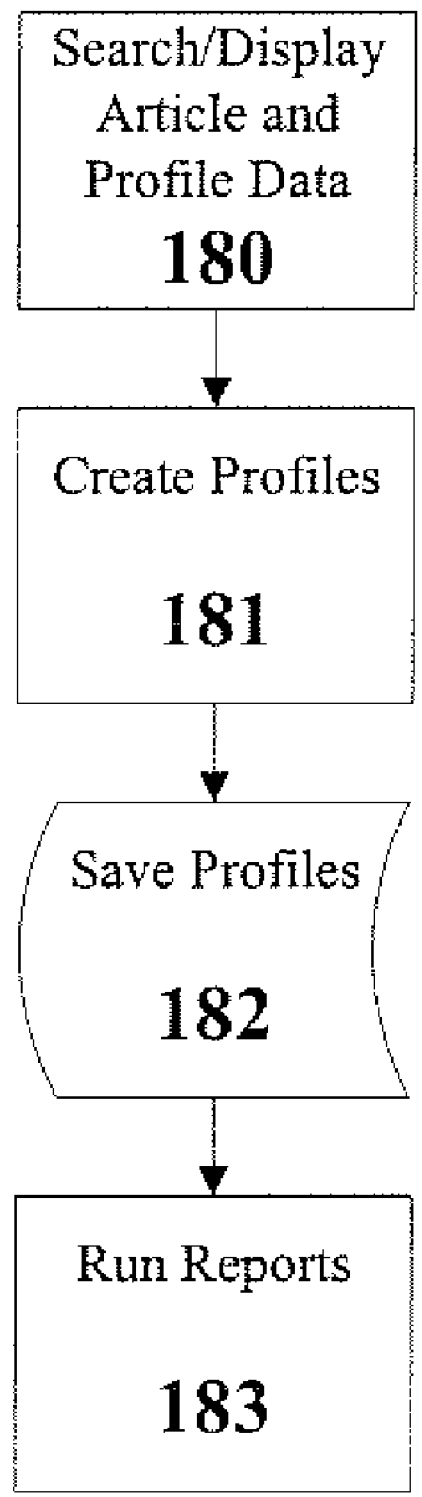
FIG. 7 is a process flow chart of an analysis module of the preferred embodiment of the present invention for producing a report.

FIG. 7 is a process flow chart of the analysis module 35 for producing a report. Upon a receipt of a request from a user for a query/analysis, the analysis module 35 searches the database 25 according to the query, obtains the search result from the database 25, and sends the result back to the client browser 111 for displaying the result.

Collection Method

In order to customize and improve search/query and analysis efficiency and productivity, the analysis module 35 further provides a collection tool (not shown), which is a profile creator that enables users to create and define, add, revise and delete profiles through a client browser 11. The profiles have permissions assigned uniquely to users for limiting user access for viewing, editing, and adding information. When stories/articles are found through search query and displayed at step 180, the user can add all, some or none of the stories/articles to a profile at step 181. The user can remove some or all of articles in the profile. Then, the analysis module 35 saves the profile in the database 25 at step 182. Based on the profile, the analysis module 35 runs and generates a report at step 183.

Report Builder

If there is a saved profile that has more than one story/article for generating a report from a client browser 11, the analysis module 35 of the present invention further allows the user to analyze the stories/articles in the profile, including, but not limited to general information of the stories/articles, branding information, and tones of the stories/articles.

General Information

One aspect of analysis is general information of the stories/articles in the profile, such as general coverage, advertising rate, broadcast documents, print documents, tones, top article types, etc.

General Coverage

For example, general coverage is a quantitative measurement for measuring both the total coverage and the total amount of articles over a date range based on the circulation values that are retrieved from the publication information of the stories/articles from the database 25.

General Advertising Rate

General advertising rate measures the total advertising equivalency of articles over a date range. The advertising equivalency is the equivalent value of paid advertising in a paper, magazine, or broadcast.

The advertising rate values are retrieved from the publication information of the stories/articles in the database 25, and the date is retrieved from the article profile in the database 25. The advertising equivalency is calculated by first determining the article type from the article profile in the database 25.

Broadcast Documents

The total time (or duration) of a broadcast story/article is calculated by subtracting the start date of the broadcast from the finish date broadcast. The advertising equivalency for a broadcast document is then determined by dividing the total time by a minute and multiplying the value for the advertising rate. Advertising rates for broadcast are usually sold by one-minute spots and that is the value the web server application 10 uses for a particular publication profile in the database 25. Both the start date and finish date are retrieved from the article profile in the database 25.

Print Documents

The advertising equivalency is determined by getting the advertising rate from the publication profile, which is the average advertising rate that advertisers charge per agate line in a publication. It has been determined that twenty two (or 22) characters make up an agate line. Therefore, the value is determined by counting the number of characters in a document and dividing it by 22 and then multiplying the value by the advertising value.

Analysis of Quotes

The analysis module 35 further analyzes quoted individuals or organizations to show how many articles their quotes were in and the average amount of quotes per story/article. These data are cross-referenced and analyzed with the tone of the story/article, the publication, the circulation and regions of the publication, and the authors who quoted them, at a later stage. These data, then, can be linked with the analysis reports for quick referencing of information.

Searching Quotes

Quotes or quoted individuals that have been saved in the database 25 can be searched by full-text queries to quickly find the associated articles.

The analysis module 35 further provides various analysis streams on the story/articles saved in the database 25, including, but not limited to average tone, tone range, top article types, top authors, top publications, top publishers, top regions, article types, print/electronic media types, print/electronic media breakdowns, broadcast type, and category breakdown of branded information.

Average Tone

Average tone is measured by the average tone over a date range calculated by the toning engine 40 of the present invention. The tone associated with the story/article is cross-referenced. All results are also linked to the search interface so documents can be viewed from the displayed values.

Tone Range

Once the toning engine 40 calculates the tones for the stories/articles in the database 25, the analysis module 35 determines the tone range by grouping the tones into positive, neutral, and negative stories/articles. The total number of stories/articles for each grouping are counted. The tone associated with the story/article is cross-referenced with the tone range and displayed.

Top Article Types

The article types are retrieved from the article profile in the database 25 and the number of different article types are counted and displayed. Also, the circulation values are tabulated from the publication profile of each article type and displayed. The top article types associated with the story/article are cross-referenced with the story/article and displayed.

Top Authors

The authors are retrieved from the article profile in the database 25, and the number of different authors are counted and displayed. Also, the circulation values are tabulated from the publication profile of each author and displayed. The top authors associated with the story/article are cross-referenced with this data and displayed.

Top Publications

The publications are retrieved from the article profile in the database 25 and the number of different publications are counted and displayed. Also, the circulation values are tabulated from the publication profile of each story/article and displayed.

Top Publishers

The publishers are retrieved from the publication profile associated with the story/article in the database 25 and the number of different publishers are counted and displayed. Also, the circulation values are tabulated from the publication profile of each publisher and displayed.

Top Regions

The top regions are retrieved from the publication profile associated with the article profile and the number of different regions are counted and displayed. Also, the circulation values are tabulated from the publication profile of each region and displayed.

Regions are predefined by the user in the region builder (not shown) and those values are lined up with the values associated with the publication.

Branding information is determined from the article categories and subcategories that are found by the parser 20.

Article Types

The article types are retrieved from the article profile and are cross-referenced with branded article sub categories and categories. The number of different branded and not branded article types are counted and displayed.

Print/Electronic Media Types

Media types are broken down by e-zines, magazines, daily newspapers, community newspapers, and others.

This information is retrieved from the publication profile associated with the article profile that is cross-referenced with branded articles that are found in subcategories and categories.

Print/Electronic Media Breakdown

The various locations of the mention or branding are broken down into sections: such as Headline, Top of the Story, Found in Story and No brand mentioned.

The number of articles that fit into each of these sections are counted and displayed. The location of where the branding is found is used conjunction with the categories and subcategories. If a category or subcategory has been flagged as branded, the Boolean keywords in the categories/subcategories are used to determine the placement in each story. The article can only have one breakdown value and the highest level has precedence. For example, in order of precedence, it would be headline, top of story, found in story, and then no brand mention.

Broadcast Types

Broadcast types are broken down into TV and radio. Optionally, it includes other types of broadcasting, such as podcast. This information is retrieved from the publication profile associated with the article profile that is cross-referenced with branded articles that are found in subcategories and categories.

Category Breakdown of Branded Information

All the categories and sub-categories that were found in the upload process for the articles that were flagged as branded are counted and displayed The category/sub-category that is associated with the article or broadcast are also cross-referenced with this data and displayed.

Categories

The top categories are displayed by counting the number of articles that are associated to the stories/articles. The subcategories are calculated the same way and the categories are used as the title for the subcategory breakdown.

The tone that is associated with the article or broadcast for both categories and subcategories are also crossed with this data and displayed.

Quotes

Quoted people or groups are retrieved from the quotes profile associated with the article profile and the number of different quoted people or groups are counted and displayed. Also, the circulation values are tabulated from the publication profile and displayed.

Calculating Charts that Use Date Ranges.

Dates are determined by getting the date range for the oldest article and newest article. All days in between those dates are counted, regardless of whether there are any articles for a given day.

If there are 10 days or less, there are no ranges, just days.

If there are over 10 days, the ranges are broken up into equal segments of 10.

If the segments can't be broken up into equal segments of ten, a remainder is given to oldest to newest days until all the remainders have been exhausted.

If there are ranges with only one day, only the day will be displayed.

Communications

Now, referring back to FIG. 2, the web server application 10 further comprises a communications module 314 accessible from a client browser 11 for receiving request for search queries from a user, and initiates searches in the database 25 for collecting and organizing the resulting data from the search queries, and pushing the organized data to at least one designated user through at least one communication protocol, such as Simple Mail Transfer Protocol (or SMTP) (email) and/or Extended Markup Language (or XML) feeds, which are downloaded automatically to client browsers, such as iTunes®. The interface is an HTML formatted web page that allows users to create search queries. Data in the database 25 can be searched by full-text search on the content, date, categories, publication, author, etc. Once the stories that match search query criteria are found, the communications module 314 gathers the attributes of the stories, i.e. headlines, summaries, publication, etc., and renders a displayable page showing the attributes on the client browser 11. This information can be sorted in order by date or relevance. The information is broken up into a plurality of manageable displayable pages. For example, no more than 20 items may be displayed in one displayable page and users can jump or toggle through pages.

Figure 23:
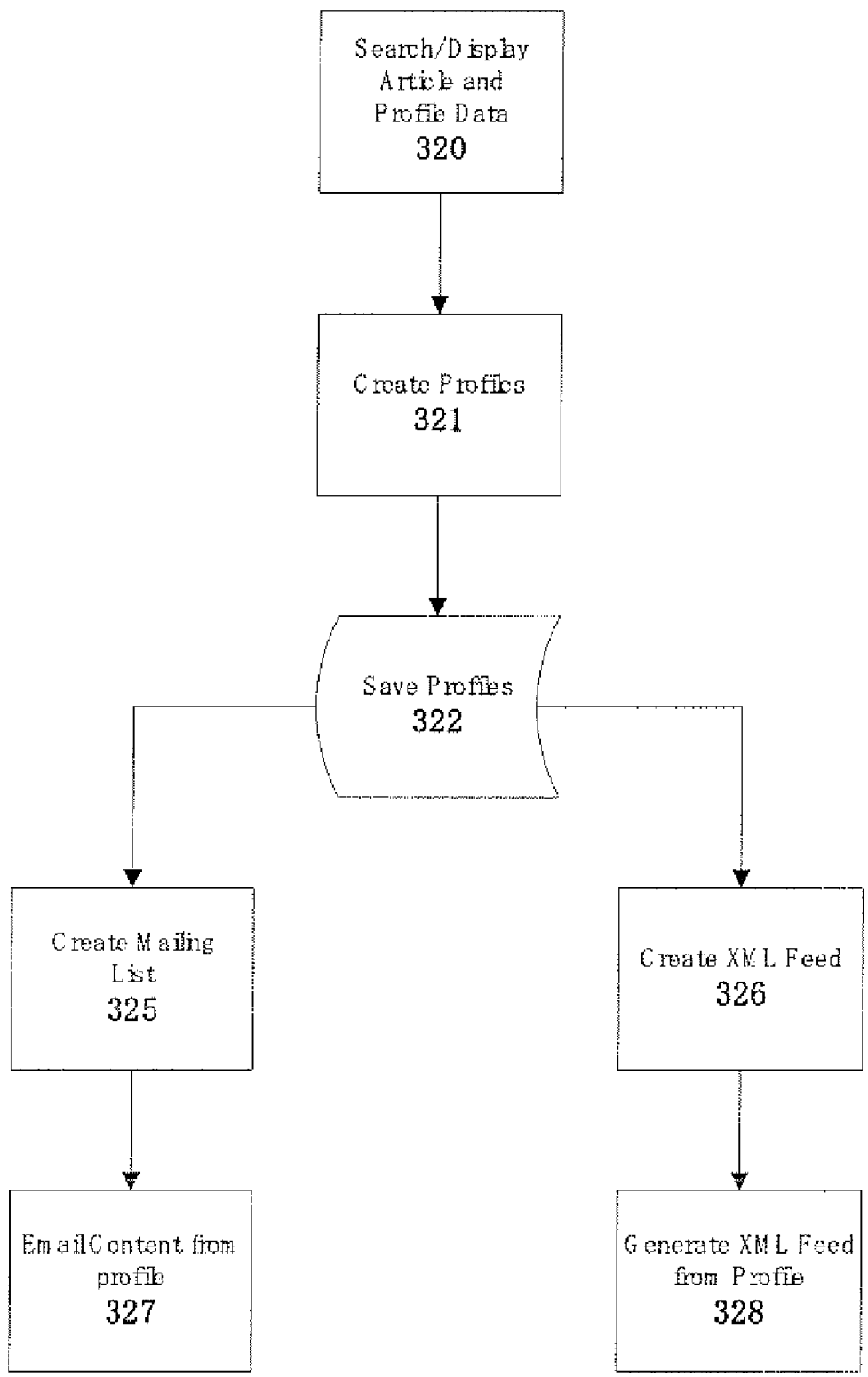
FIG. 23 is a process flow chart of a communications module of the preferred embodiment of the present invention.

FIG. 23 is a process flow chart of the communications module 314 for pushing content to users. Upon receipt of a user's request for a query, the communications module 314 searches the database 25 according to the query, obtains the search result from the database 25, and sends the result back to the client browser 11 for displaying the result.

a) Collection Method

In order to customize and improve search/query and analysis efficiency and productivity, the communications module 314 further provides a collection tool (not shown), which is a profile creator that enables users to create and define, add, revise and delete profiles through a client browser 11. The profiles have permissions assigned uniquely to users for limiting user access for viewing, editing, and adding information in the profiles. When stories/articles are found through search query and displayed at the client browser 11 at step 320, the user can add all, some or none of the stories/articles to a profile at step 321. The user can remove some or all of articles in the profile. Then, the communications module 314 saves the profile in the database 25 at step 322.

b) Emailing Method (SMTP)

Recipient lists can be built through a client browser 11 from the user access table (not shown) on the database 25. The recipient lists contain user email addresses for distributing the search query results/articles based on the profiles. Through the web client interface of the communications module 314, other email addresses can also be added for creating recipient lists at the step 325. The articles can then be emailed to users through SMTP to send emails to the clients included in the recipient lists by building an email from articles saved in the profile, at step 327. Articles in the email can be formatted either in HTML or plain text. Files that are attached to articles in the system can be attached to the email. Both entire articles and summaries of articles can be sent. Links to original articles in the system can also be sent. Emails can be formatted and organized to include category sections and summaries at the top of the email to link to the complete story within an HTML formatted email.

c) XML Feed Creator

The communications module 314 builds XML formatted feeds from profiles at step 3211 so that the communication module 314 can redistribute information, or the XML formatted feeds can be pulled by other systems and any other client applications. For example, one of the client application, such as iTunes, may pull the XML formatted feed from the communications module 314 to populate podcasts into a mobile device or computer. Through the web client interface of the communications module 314, the users can select the type of XML feed, such as an RSS feed, depending on what they wish to receive from the communications module 314. The user may save this preference via the communication module 314 by providing a unique name to identify the feed whenever the users accesses and receives the feed from the communication module 314 at step 326. When a feed is created, the source address or location of the feed is displayed on the client browser 11 with the creator of the feed, so the particulars of the feed can be sent to the users. The address represents the location (such as IP address, domain name, etc) of the server The address and the variables of the feed will be passed to the client browser 11 to build and retrieve the data from the communications module 314. When a user retrieves data from the provided address at a later time, the user is prompted to enter his/her username and password from the communications module 314. The client browser 11 transmits the variables including the address string, which are parsed by the communications module 314. Based on the information transmitted by the user, the communications module 314 searches in the database 25 and creates the XML feed at step 328 based on the variables and the profile associated with the created feed.

d) Posting Comments

When data in the database 25 is searched, articles and author profiles can be accessed. Users of the web server application 10 can post and view comments on articles and author profiles through a client browser via the communications module 314.

Toning Engine

The web server application 10 of the present invention further comprises a toning engine 40 to provide a tool, which will automatically tone stories/articles on a user's behalf, based on a combined analysis of the actual document tone, and other factors which would attempt to assess the impact a specific article may have. In the preferred embodiment of the present invention, the toning engine 40 comprises at least one Bayesian Inference filter for arriving a tone. In practice the toning process consists, broadly speaking, of two steps: firstly, calculation of word tone, comprising the steps of breaking a story/article down to individual words, and analyzing the past instances/tones of those words, then combining these word 'scores' to arrive at a tone for the complete article; secondly, calculation of impact tone, comprising steps of examining a story/article for certain predefined attributes (such as circulation of the publication, whether the article featured on a prominent page, and whether it matches predefined categories) to assess it's potential impact. This impact tone enables the toning engine 40 to arrive at a more accurate final tone even without providing sufficient training to the toning engine 40.

To make the toning engine 40 operational for practical day-to-day use, the toning engine 40 must go through a period of training. This involves a human operator manually assigning a tone to a story/article and performing a system operation that tells the application to enter the word and attribute statistics of the article into the database 25.

In the preferred embodiment of the present invention, tones are considered to be hypotheses, i.e. a given article will hypothetically fall under only one of a plurality of (editorial) tones. In a preferred embodiment of the present invention, the toning engine 40 tones an article one of eleven tone levels, i.e. 5, 4, 3, 2, 1, 0, −1, −2, −3, −4 and −5. Each tone level is provided with a hypothetical value, i.e. $H_5$, $H_4$, $H_3$, $H_2$, $H_1$, $H_0$, $H_{-1}$, $H_{-2}$, $H_{-3}$, $H_{-4}$, and $H_{-5}$, respectively.

A datum D is the observation of a meaningful minimum section of the content of an article, i.e. a single word. Optionally, The meaningful minimum section of the content of the article, or datum D, may be a quote or a commonly used phrase. $P(H_x|D)$ is the probability of the hypothesis of tone level x as a factor of the datum D. $P(D|H_x)$ is the probability of datum D as a factor of $H_x$. Then, the probability $P(H_x|D)$ that new incidence of a datum D, i.e. a single word in an article, is tone level x can be expressed in the following equation:

$$P(H_x|D) = \frac{P(H_x) \times P(D|H_x)}{\sum_{i=-5}^{5} P(H_i) \times P(D|H_i)}$$

Tone of a story/article is determined by keeping track of scores, $P(H_x|D)$, for every word in the article. In order for the toning engine 40 to suggest a tone appropriately or accurately, it needs to be trained.

Figure 8:
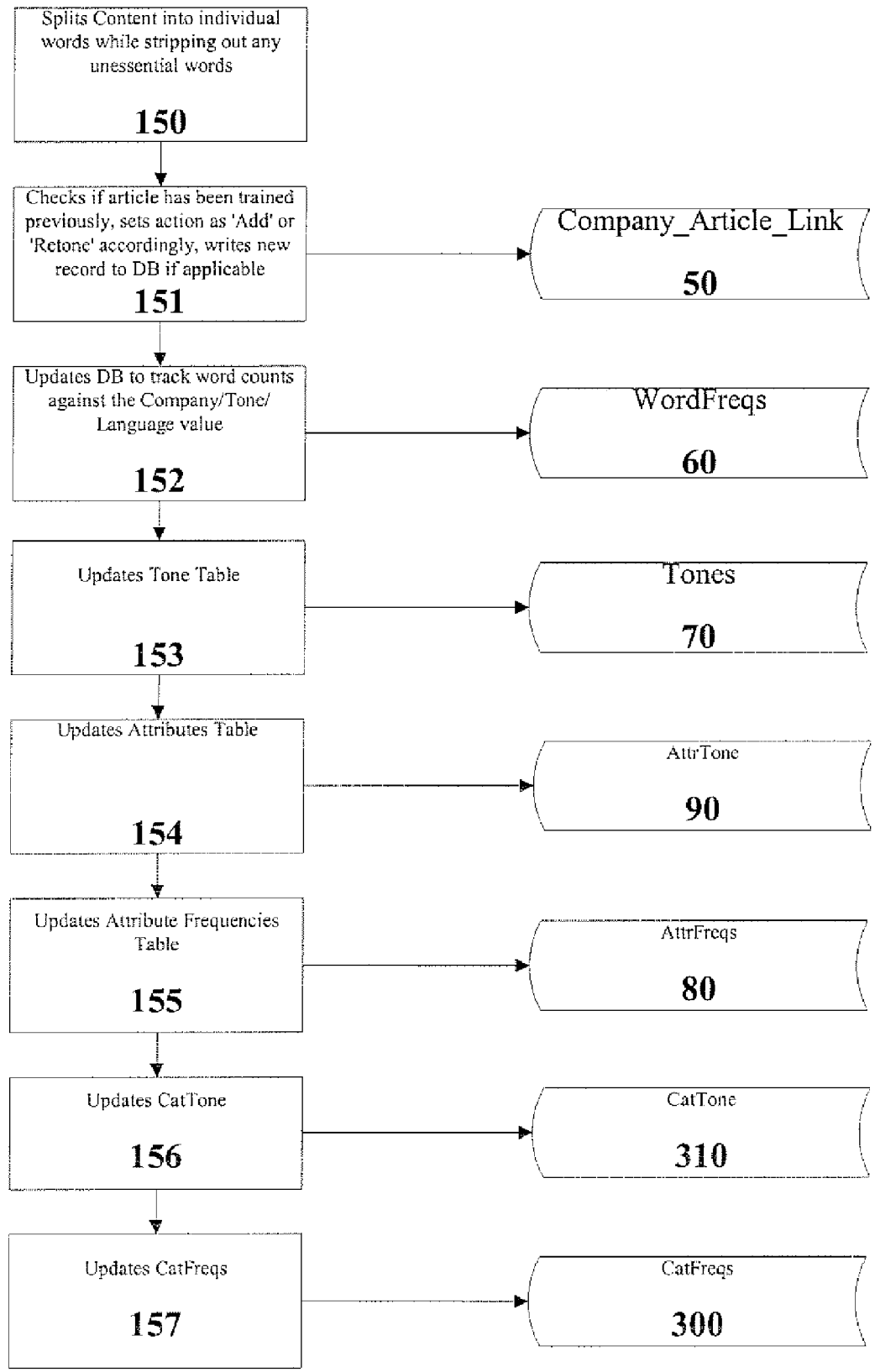
FIG. 8 is a flow chart, illustrating a training process for a toning engine of the preferred embodiment of present invention by using a sample story(ies)/article(s)

FIG. 8 is a flow chart, illustrating a training process for the toning engine 40 of the present invention by using a sample story(ies)/article(s). Each time an article is submitted to the training filter, the training process consists of the following steps.

At the step 150, the toning engine 40 takes the article, a predefined tone by an Editor, company name, and language that the article was written in, and splits the content into minimum meaningful sections, i.e. single words, while stripping all the non-essential sections or words contained in an ignore list of words. This ignore list is a predefined list of words/keywords that enables the toning engine 40 to filter out non-essential words, such as articles including "a", "an" and "the", and process only essential single words for the training. In the preferred embodiment of the present invention, a user of the toning engine 40 may define at least one list of words that the toning engine 40 must ignore for analyzing and deriving a tone. Once unwanted words are filtered out, the toning engine 40 generates an array of single words for maintaining a sequence of occurrence of words in the article.

Once the toning engine 40 finishes splitting the content, then at the step 151, the toning engine 40 checks the data to determine whether the article just parsed has been used for training previously by querying Company_Article_Link 50 table in the database 25. Referring to FIG. 15, Company_Article_Link 50 table comprises a plurality of columns, including, but not limited to, News_Num 51 for storing a link to Content_Articles 30 of the database 25 for retrieving the original article from it, Company_Num 52 for allowing each article to be toned separately for client company (or companies) and competitor(s), Language 53 for specifying language of the article, Tone 54 for storing tone of the article, which corresponds to Editor_Tone 31J in Content_Articles 30, Toned_by 55 for specifying who toned the article, i.e. a "user" or by the toning engine 40. The query to Company_Article_Link 50 is based on News_Num 51, Company_Num 52 and Tone 54. If there is a database record for the article, the record is updated based on the array of single words of the article, suggested tone by the Editor and Company. If there is no database record for the article found in Company_Article_Link 50 database, then the toning engine 40 creates and stores a record for the article in Company_Article_Link 50 table in the database 25.

Once the record is found or created in Company_Article_Link 50, then, at the step 152, the toning engine 40 updates a table, Word_Freqs 60 of the database 25, where Word_Freqs 60 keeps track of each word's appearance in the articles and associated tones (predetermined for training), so that, once the toning engine 40 is trained, the toning engine 40 is able to rate every word and to keep track of the rated score as it appears in the content of an article based on previous appearances in filtered articles. Referring to FIG. 16, the table, Word_Freqs 60, comprises a plurality of columns, including, but not limited to, Word 61 for tracking individual word, Tone 62 for keeping tack tones associated with each individual word, Company_Num 63 for allowing each individual word to be toned separately for client company(ies) and competitor(s), Language 65 for tracking language of the article, and Frequency 66 for tracking number of times that each individual word has appeared for each combination of Tone 62/Company_Num 63/Language 65.

Once Word_Freqs 60 is updated, then, at step 153, the toning engine 40 updates another table, Tones 70, of the database 25, where, referring to FIG. 17, Tones 70 comprises a plurality of columns, including but not limited to Tone 71 for tracking tone levels of articles processed, Company_Num 72 for allowing each article to be toned separately for client company(ies) and competitor(s), Language 73 for tracking language of the article, and Word_Count 75 for tracking number of words in total for each combination of Tone 71/Company_Num 72/Language 73. Updating both Word_Freqs 60 and Tones 70 effectively updates $P(D|H_x)$, where x is 5, 4, 3, 2, 1, 0, −1, −2, −3, −4 and −5, i.e.

$$P(D|H_x) = \frac{\#\_of\_Prior\_Appearances}{Total\_\#\_of\_Words\_For\_Tone\_x}$$

where, #_of_Prior_Appearances is a number of prior appearances of a datum D for the tone x, and Total_#_of_Words_For_Tone_x is a total number of words appeared for toning x.

In the similar manner, referring back to FIG. 8, $P(D|H_x)$ and $P(H_x|D)$ for attributes are calculated, assuming that, in this case, a datum D is an attribute, then the toning engine 40 updates AttrTones 90 table of the database 25 at step 154. Then, at step 155, the toning engine 40 updates a table, AttrFreqs 80 of the database 25, where AttrFreqs 80 keeps track of each attribute's appearance in the stories/articles and associated tones (predetermined for training), so that, once the toning engine 40 is trained, the toning engine 40 is able to rate every attribute and to keep track of the rated score as it appears in a story/article based on previous appearances in toned articles.

Also, in the similar manner, $P(D|H_x)$ and $P(H_x|D)$ for categories are calculated, assuming that, in this case, a datum D is a category, then the toning engine 40 updates CatTone 310 table of the database 25 at step 156. Then, at step 157, the toning engine 40 updates a table, CatFreqs 300 of the database 25, where CatFreqs 300 keeps track of each category's appearance in the stories/articles and associated tones (predetermined for training), so that, once the toning engine 40 is trained, the toning engine 40 is able to rate every category and to keep track of the rated score as it appears in a story/article based on previous appearances in toned articles.

Figure 9:
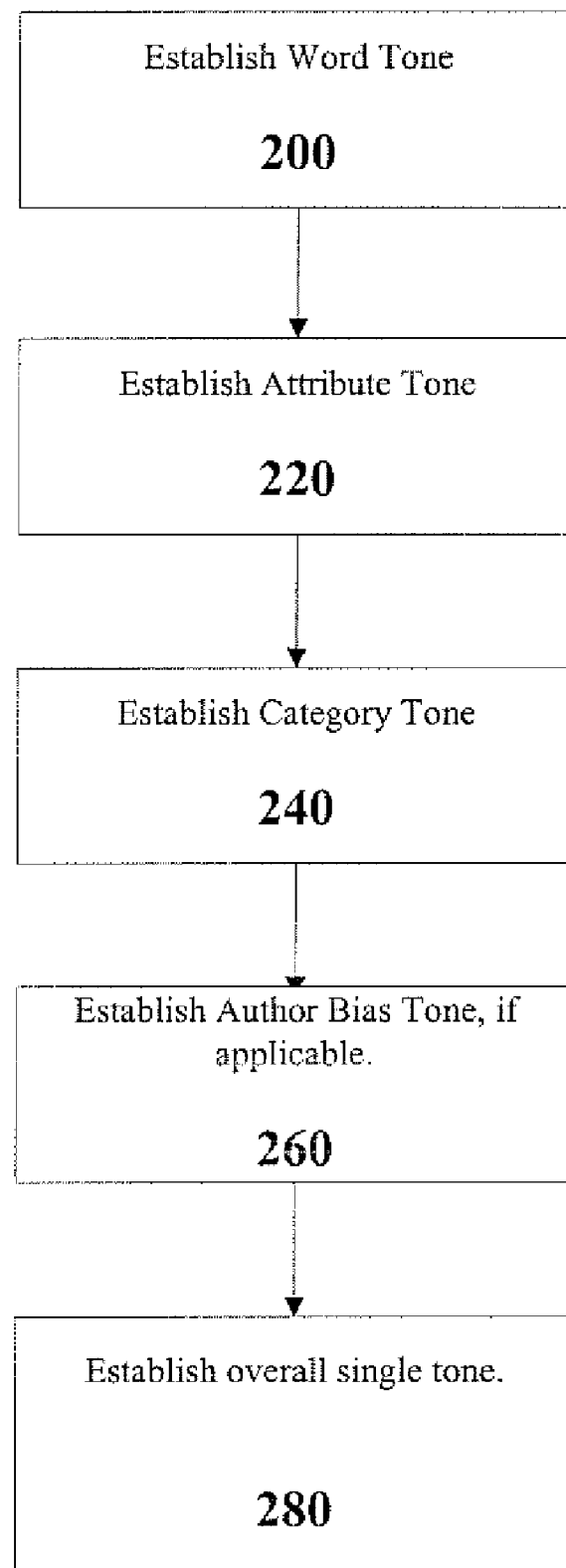
FIG. 9 is a high-level process flow chart, illustrating the overview how the toning engine of the preferred embodiment of the present invention tones an article.

FIG. 9 is a high-level process flow chart, illustrating how the toning engine 40 tones an article. At step 200, the toning engine 40 of the present invention establishes word tone based on tones of all words in the content of the story/article, which is the most significant part of the toning engine 40. The reason for such importance is that the accuracy of the toning engine 40 improves with the amount of data (or "evidence") available prior to the toning of a story/article, and most stories/articles will contain at least 100 words, or usually considerably more words. The evidence is a set of data stored within the web server application 10, which reflects the results of users submitting a large number of manually toned stories/articles during the training phase At steps 220 and 240, the toning engine 40 establishes tones based on attributes and categories of the story/article, respectfully. The data showing the attribute and category links for the story/article is already in the database 25, as the attributes and categories are assigned during the story/article uploading process. The attributes are predefined criteria that help to assess the potential impact of a story/article, or impact score. Impact score is an attempt to measure the reach and influence of a particular article. This begins with tone, and then considers factors such as the circulation of the publication, whether the article was accompanied by a photo, whether the brand and/or company name was mentioned, whether the article type was an editorial or regular opinion column, what page the article appeared on, and how many pre-defined phrases or word combinations (categories) were present in the article. A very positive article may have its tone revised downwards if has a very low impact score. So the combination of tone and impact score are at the heart of the toning engine 40 of the present invention, which seeks to provide an accurate reflection of the tone, and also how much influence and exposure an article can expect to have.

Categories are word combinations, identified and entered into the web server application 10 by a client user, that represent key phrases that are of interest to the client for various forms of analysis. General examples would be brand names—to further aid analysis category definition can be flagged as a brand name. Other examples could be references to the client's industry.

Note that the combined attributes examined in steps 220 and 240 will rarely be a number higher than 10, and could conceivably be zero.

At step 260, an Author Bias Tone is calculated only when the article type is 'Editorial' or 'Column' (i.e. an opinion piece, as opposed to straight reporting with no bias). The calculation for this will be more straightforward. The toning engine 40 calculates the Author Bias Tone by examining all articles by the same author, and counting all negative (−1 to −5) tone ratings as −1, all neutral (0) ratings as 0, and all positive (1 to 5) ratings as 1. This figure may then play a part in the final tone calculation e.g. influencing a tie-breaker situation between two competing tones.

The Author Bias Tone may be an optional step for calculating the tone for a story/article, and may not be seen as a constant or full feature of the toning engine 40; however, it is rather an extra source of evidence that can be considered when a situation allows and justifies it.

Having established the Word, Attribute, Category and Author Bias Tones, the toning engine 40 derives the final overall tone for the story/article at step 280. Each of the established tones is weighed differently to arrive the final overall tone for difference circumstances.

For example, assuming that the toning engine 40 processes a. 10,000-word article, with 100% word recognition. There are no linked categories or author bias, and only one attribute is considered for deciding a tone of the article. Clearly the weighting has to favour the word tone very heavily. By contrast, a 100-word article that has only 50% word recognition, but 5 linked categories and 3 linked attributes, needs a more balanced weighting between the Word and Impact tones from the toning engine 40. The weighting calculation according to the size of the story/article will provide an intelligent sliding scale on which to base this last stage of the tone determination.

Based on the word toning, the toning engine 40 is able to make a tone suggestion for a given article, as long as at least one word in that article has been through the filter previously. However, the reliability of the suggestion of a tone depends on a number of factors, which mainly evolve around how much evidence there is available for toning a particular article, so that the toning engine 40 can be used to rate the current article.

The toning engine 40 should possess sufficient intelligence to decide whether the tone it arrives at is sufficiently reliable. The identification of this level of reliability relies on the existence of a 'no-tone zone'—the name given to the area failing short of the point at which there is enough evidence to accurately suggest a single tone that is clearly preferable to the others. The reliability improves as more evidences become available for toning a story/article. The inclusion of the impact tone calculation helps to reduce the size of the no-tone zone, and enable the toning engine 40 to arrive at more accurate toning at much shorter training time.

Figure 22:
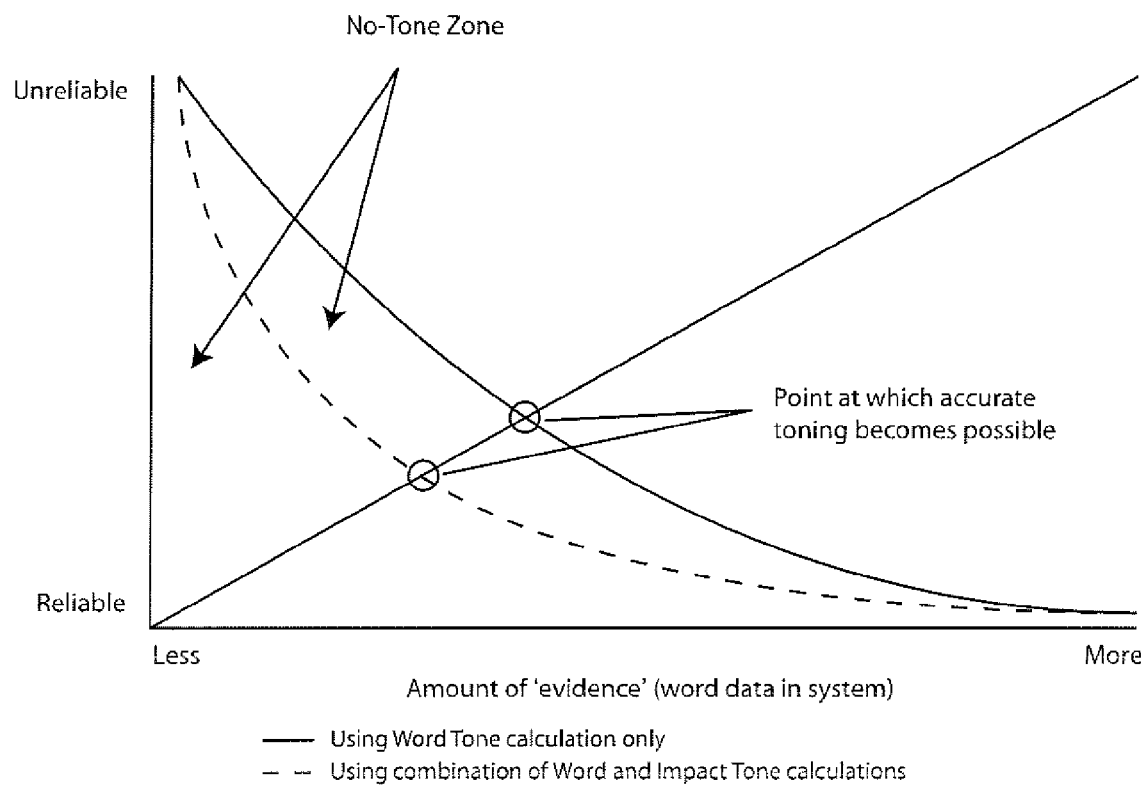
FIG. 22 is a graph illustrating how, in effect, the impact tone calculation and weighing the impact tone calculation into the overall tone calculation.

FIG. 22 is a graph illustrating how, in effect, the addition of the impact tone calculation into the toning engine "pushes down" the outside edge of the 'no-tone zone', resulting in more accurate toning at an earlier stage. The toning engine 40 will decide on a level of reliability that must be met before the toning engine 40 reports a suggested tone to the user. Anything below this level falls into the 'no-tone zone'—at which point the user will be informed of the toning engine 40 inability to accurately tone an article due to the lack of available data.

Figure 10:
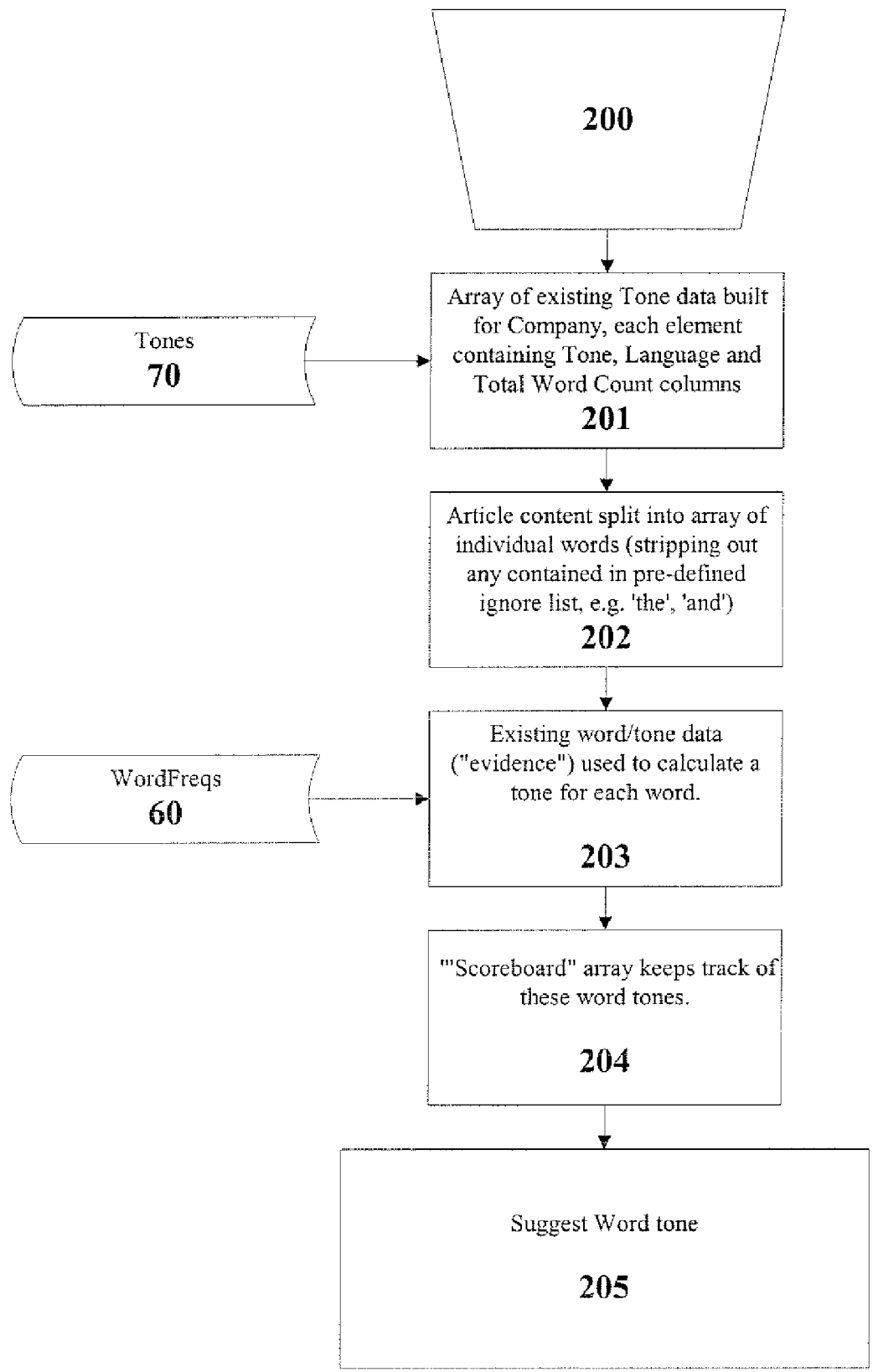
FIG. 10 is a process flow chart, illustrating the sub-steps for establishing word tone.

FIG. 10 is a process flow chart, illustrating the steps for establishing word tone. For example, assume that the toning engine 40 is processing the single word 'industry' from an article, then datum (D) represents "the observation of the word 'industry'". Before 'observing' the word, the probability of the article corresponding to Tone x, or $P(H_x)$ is initially equal among all of the hypothesis for tone level 5, 4, 3, 2, 1, 0, −1, −2, −3, −4 and −5, i.e.

$$P(H_5)=P(H_4)=P(H_1)=P(H_2)=P(H_1)=P(H_{-1})=P(H_{-2})=P(H_{-3})=P(H_{-3})=P(H_{-4})=P(H_{-5})$$

At step 201, the toning engine 40 accesses Tones 70 to retrieve an array of existing Tone data built for company, each element containing Tone 71, Company_Num 72, Language 73, and Word_Count 75 columns.

The toning engine 40, then at step 202, splits the content of the story/article into array of individual words while stripping out any non-essential words/expressions/terms contained in the pre-defined ignore list, e.g. 'the', 'and'. Once the content is parsed and the content of the story/article is serialized, the toning engine 40 accesses Word_Freqs 60 for retrieving existing word/tone data ("evidence") used to calculate a tone for each word at step 203. For example, while the toning engine 40 is observing the word 'industry', the toning engine 40 is able to examine past evidence, e.g. how many times 'industry' has been associated with tone x based on the data retrieved from the databases, Word_Freqs 60 and Tones 70. Then, the toning engine 40 derives at a revision of the probability to P(H$_x$|D$_{\text{``industry''}}$), which means the probability of H$_x$ as a factor of the datum "industry", which is the word just observed, where x is tone level 5 to −5.

So, for example, when the word 'industry' appears, then the toning engine 40 looks at the evidence in terms of the word 'industry', and finds that the word has appeared the following number of times against the indicated tones from the databases, Word_Freqs 60 and Tones 70. In the present example, it is assumed that the word 'industry' has appeared 16, 38 and 12 times against tone levels 5, 2 and −3, respectively. It is also assumed that the total number of words recorded for tone levels 5, 2 and −3 are 1000, 3750, and 985, respectively. Then, the probability of the datum, "observation of word 'industry'", as a factor of H$_5$, H$_2$ and H$_{-3}$ are calculated as following;

$$P(D_{\text{``industry''}}|H_5)=16/1000=0.016$$

$$P(D_{\text{``industry''}}|H_2)=38/3750=0.01013$$

$$P(D_{\text{``industry''}}|H_{-3})=12/985=0.0122$$

Then, the toning engine 40 calculates probabilities of the tone levels 5, 2 and −3, or P(H$_5$|D$_{\text{``industry''}}$), and P(H$_2$|D$_{\text{``industry''}}$), based on the word 'industry' that would result in the article to be rated at tone levels 5, 2, and −3, respectively.

$$P(H_5|D'_{industry'}) = \frac{P(H_5) \times P(D'_{industry'}|H_5)}{\sum_{i=-5}^{5} P(H_i) \times P(D|H_i)} = 0.4174$$

$$P(H_2|D'_{industry'}) = \frac{P(H_2) \times P(D'_{industry'}|H_2)}{\sum_{i=-5}^{5} P(H_i) \times P(D|H_i)} = 0.2643$$

$$P(H_{-3}|D'_{industry'}) = \frac{P(H_{-3}) \times P(D'_{industry'}|H_{-3})}{\sum_{i=-5}^{5} P(H_i) \times P(D|H_i)} = 0.3183$$

Apparently, in the present example, the appearance of the word 'industry' suggests a Tone of 5. However, it is to be noted that this is just one word being toned, thus all the other words in the article need to be considered to derive a tone of the article.

Each of the resulting tones is kept track by the toning engine 40 at step 204. The toning engine 40 builds an array of resulting tones based on all the words appearing in the article. Each entry in the array comprises P(H$_n$|D) scores, which suggest a highest score for a single tone. Then, the toning engine 40 keeps track of how each tone level scores.

At the end, step 205, the tone with the highest score is suggested as the tone for the article.

Figure 11:
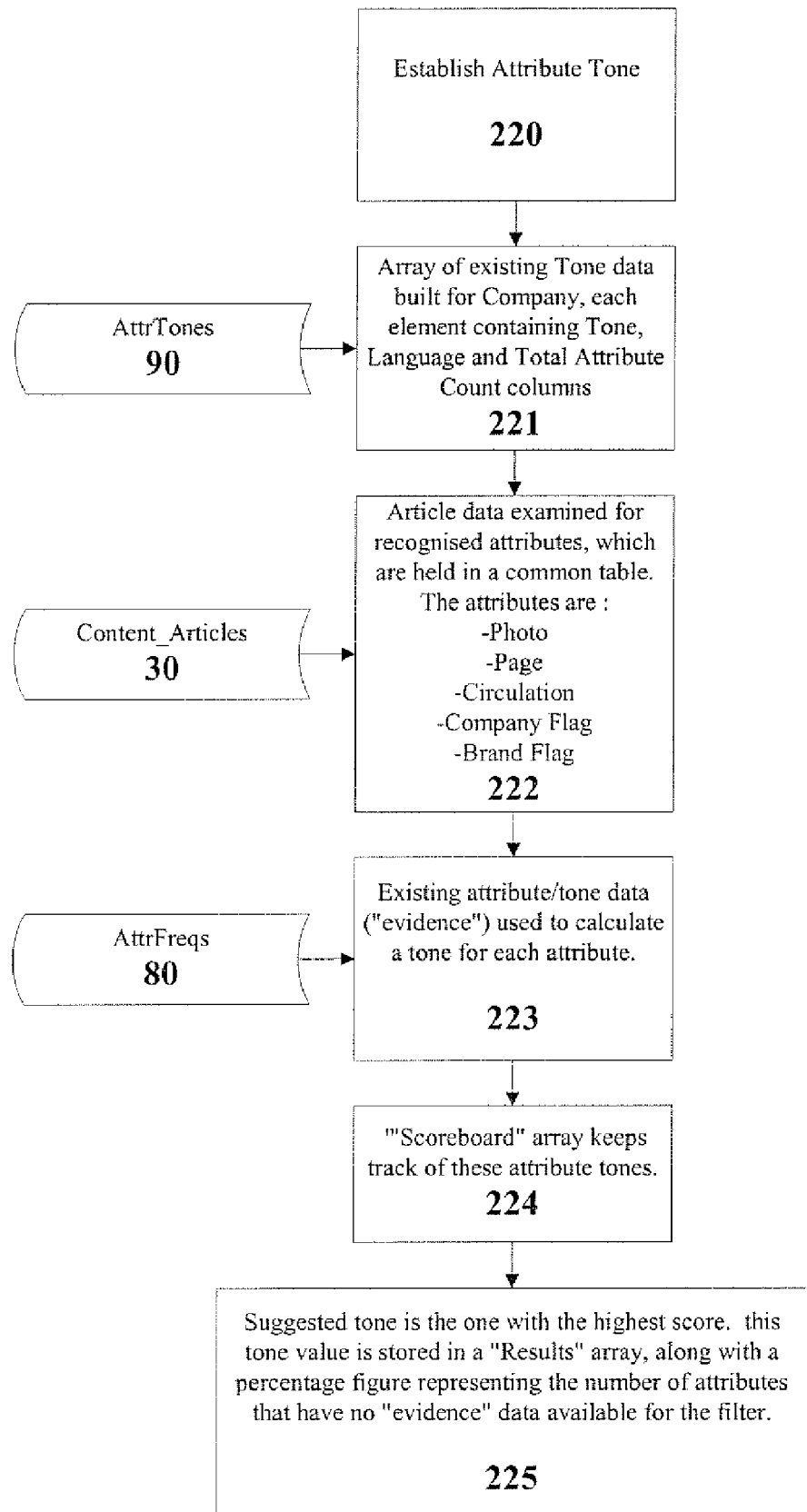
FIG. 11 is a process flow chart, illustrating the sub-steps for establishing attribute tone of the story/article.
Figure 19:
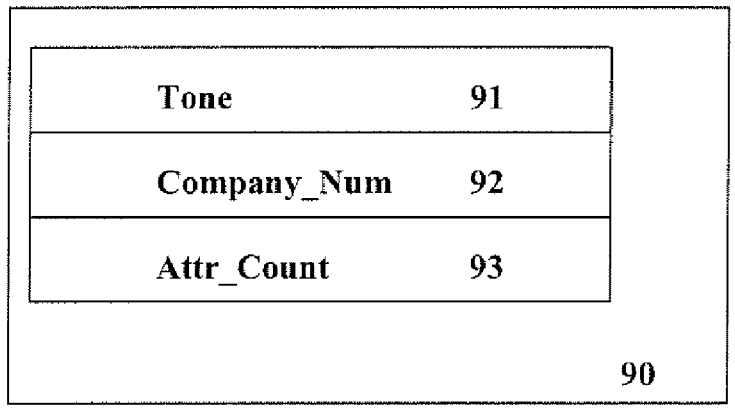
FIG. 19 is a conceptual diagram, illustrating columns of a table, AttrTones.
Figure 20:
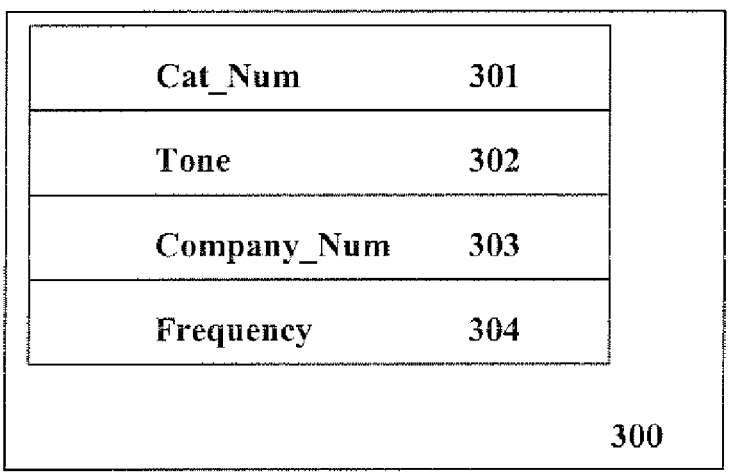
FIG. 20 is a conceptual diagram, illustrating columns of a table, CatFreqs.

FIG. 11 is a process flow chart, illustrating the sub-steps for establishing attribute tone of the story/article. At step 221, the toning engine 40 accesses AttrTones 90 for retrieving an array of existing attribute tone data built for company, where the table, AttrTones 90 comprises a plurality of columns, including, but not limited to, Article Tone 91, Company_Num 92 and Attribute_Count 93 columns (reference to FIG. 19). At step 222, the toning engine 40 retrieves recognized attributes, which are held in the table, Content_Articles 30. The recognized attributes for determining attribute tones includes, but not limited to, Photo, Page, Circulation, Company Flag, and Brand Flag, and stored in the columns Photo 31K, Page 31L, Circulation 31M, Company Flag 31N, and Brand Flag 31O, respectfully, of the table, Content_Articles 30 of the database 25. Once the recognized attribute data is retrieved from the table, Content_Articles 30, the toning engine 40, at step 223, retrieves "evidence" or existing attribute/tone data from a table, AttrFreqs 80 to calculate a tone for each of the recognized attribute data for the story/article. AttrFreqs 80, referring to FIG. 18, comprises Attr_Num 81, Tone 82, Company_Num 83 and Frequency 84 columns. At step 224, the toning engine 40 keeps track of each of the resulting attribute tones. The toning engine 40 builds an array of the resulting attribute tones based on all the attributes associated with the story/article. Once the toning engine 40 processes all of the recognized attributes, the toning engine 40 determines the suggested attribute tone for the story/article, which is the one with the highest score. This tone value is stored in a "Results" array, along with a percentage figure representing the number of attributes that have no "evidence" data available for the toning engine 40.

Figure 12:
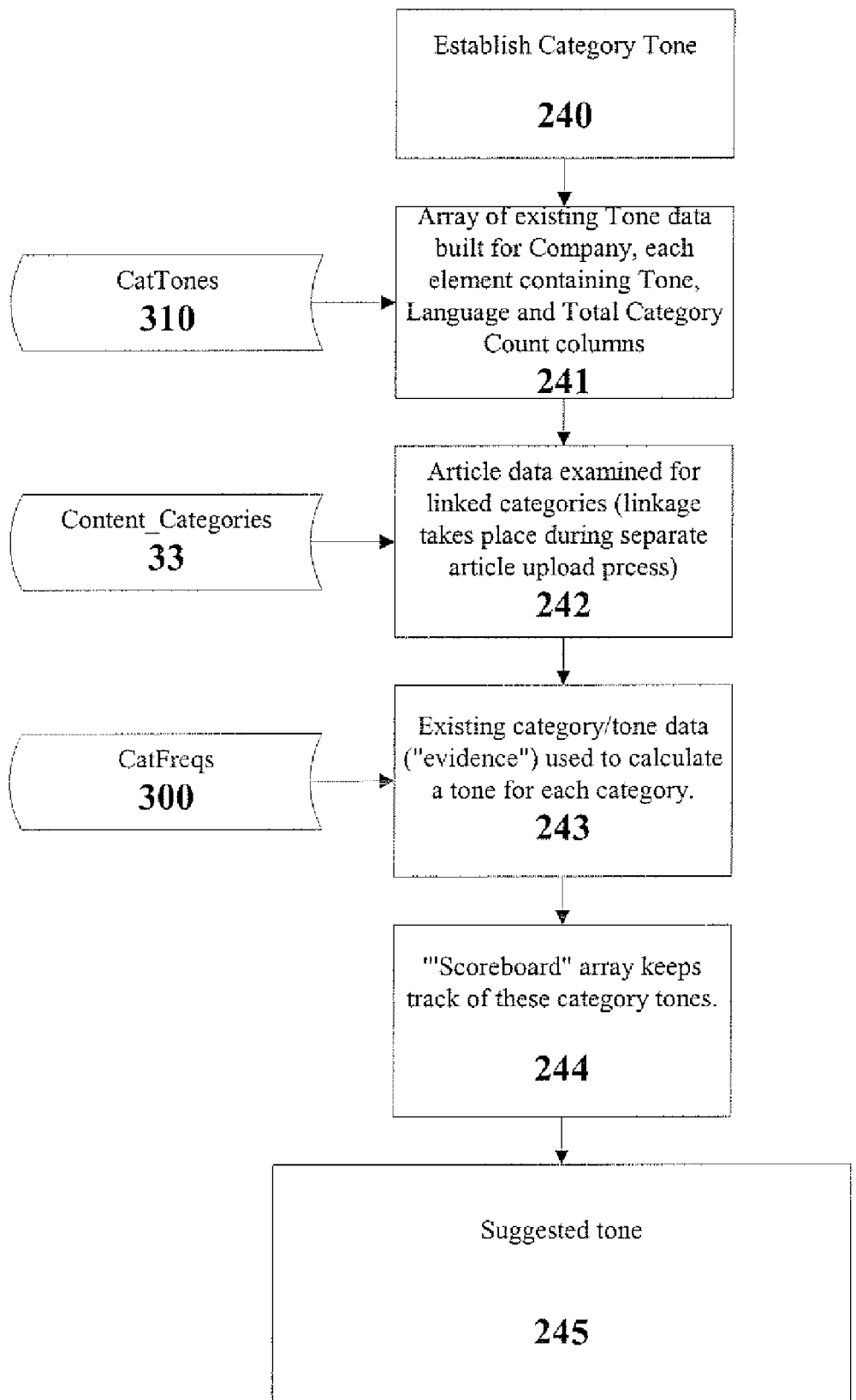
FIG. 12 is a process flow chart, illustrating the sub-steps for establishing attribute tone of the story/article.
Figure 21:
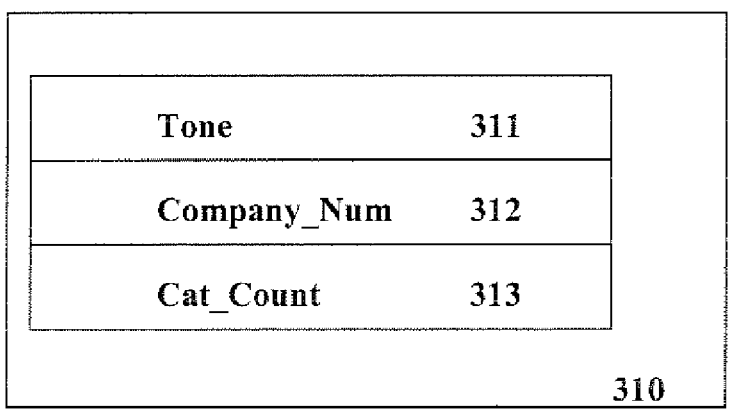
FIG. 21 is a conceptual diagram, illustrating columns of a table, CatTones.

FIG. 12 is a process flow chart, illustrating the steps for establishing attribute tone of the story/article. At step 241, the toning engine 40 accesses CatTones 310 for retrieving an array of existing category tone data built for company, the table, CatTones 310 comprises a plurality of columns, including, but not limited to, Category_Tone 311, Company_Num 312 and Category_Count 313 (refer to FIG. 21). At step 242, the toning engine 40 retrieves linked categories, which are held in the table Content_Categories 37. The linked categories are then used for determining category tones. Once the linked category data are retrieved from the table Content_Categories 37, the toning engine 40, at step 243, retrieves "evidence", or existing category/tone data, from the table CatFreqs 300 to calculate a tone for each of the linked category data for the story/article. The table, CatFreqs 300, comprises a plurality of columns, including, but not limited to, Cat_Num 301, Tone 302, Company_Num 303 and Frequency 304. At the step 244, the toning engine 40 keeps track of each of the resulting category tones. The toning engine 40 builds an array of the resulting category tones based on all the linked categories associated with the story/article. Once all the linked categories are processed by the toning engine 40, the toning engine 40 determines the suggested category tone for the story/article, which is the one with the highest score at step 245. This tone value is stored in a "Results" array, along with a percentage figure representing the number of categories that have no "evidence" data available for the toning engine 40.

Figure 13:
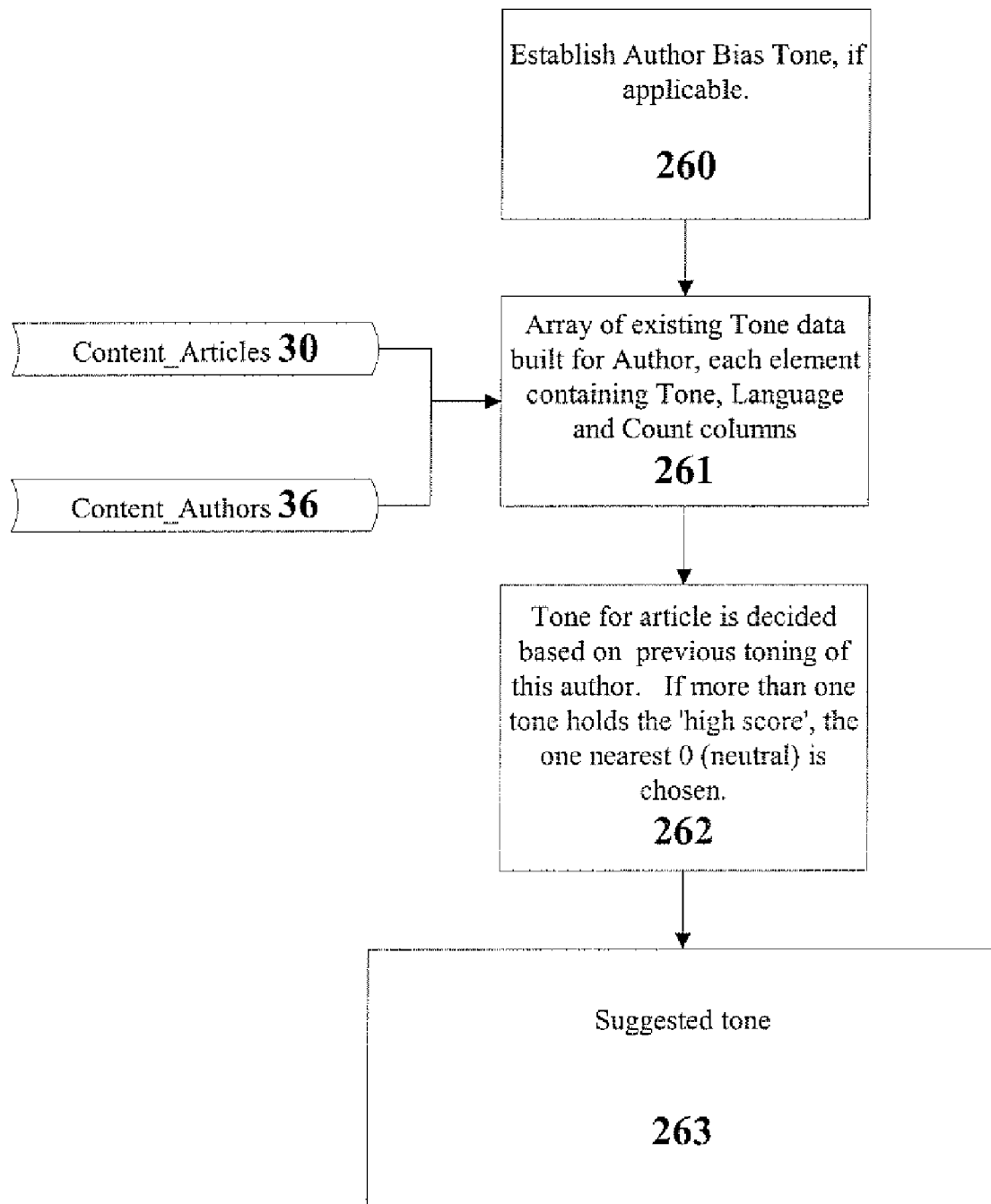
FIG. 13 is a process flow chart, illustrating the sub-steps for establishing Author Bias tone of the story/article.

FIG. 13 is a process flow chart, illustrating the sub-steps for establishing Author Bias tone of the story/article. At step 261, the toning engine 40 accesses both Content_Articles 30 and Content_Authors 36 to retrieve existing tone data for the author. The toning engine 40 determines the tone of the story/article based on the previous toning of this author at step 262. If more than one tone holds the highest score, the one nearest 0 (meaning "neutral") is chosen. At step 263, the suggested author bias tone is the one with the highest score.

At each level in the database (word, tone, article), the data are tied to language. When the toning engine 40 is trained or when a tone is requested, the language of the article must be supplied. Therefore the toning engine 40 is a language independent tool.

It is to be understood that the embodiments and variations shown and described herein are merely illustrations of the principles of this invention and that various modifications may be implemented by those skilled in the art without departing from the spirit and scope of the invention.

The invention claimed is:

1. A web-based media analysis computer system for analyzing at least one media content that includes text, comprising:
   i. a memory comprising at least one database being accessible to the computer system;
   ii. the computer system implementing an uploader that uploads said at least one media content from at least one content provider over a communication network;
   iii. the computer system implementing a parser that converts each of said at least one media content into serialized data, filters out unessential data from said serialized data according to a predefined list of unessential data, rationalizes nouns, pronouns and names in said each of said at least one media content, and extracts attributes and categories of said each of said at least one media content, one or more quotes, and attributes of said one or more quotes from said serialized and filtered data of said each of said at least one media content using regular expressions and predefined parsing rules, relationally stores and cross-references said serialized and filtered data, said extracted attributes and said categories of said each of said at least one media content, said one or more quotes, and said attributes of said one or more quotes into a plurality of tables in said at least one database, wherein said attributes of said one or more quotes comprise the name of the quoted person or organization; and
   iv. the computer system implementing an analysis module that retrieves data from said plurality of said tables in said at least one database and wherein said analysis module further comprises a toning engine that determines a tone level of said each of said at least one media, said toning engine is provided with tone level probabilities of meaningful minimum sections, tone level probabilities for attributes, and tone level probabilities for categories in said at least one database, said tone engine:
      a. parses each of said at least one media content and splitting into serialized meaningful minimum sections;
      b. retrieves, from said at least one database, said tone level probabilities for each of said serialized meaningful minimum sections that cause said each of said at least one media content to be toned at, and determines most probable tone levels of said each of said at least one media content based on said tone level probabilities of said serialized meaningful minimum sections;
      c. retrieves, from said at least one database, said extracted attributes of said each of said at least one media content and said tone level probabilities for each of said attributes of said each of said at least one media content, and determines most probable tone levels of said each of said at least one media content based on said tone level probabilities of said attributes;
      d. retrieves, from said at least one database, said extracted categories of said each of said at least one media content and said tone level probabilities for each of said categories of said each of said at least one media content, and determines most probable tone levels of said each of said at least one media content based on said tone level probabilities of said categories; and establishes said most probable tone level of said each of said at least one media content by weighing and ranking said most probable tone levels of said each of said at least one media content based on said tone level probabilities of said each of said serialized meaningful minimum sections, said most probable tone levels of said each of said at least one media content based on said tone level probabilities of said attributes, and said most probable tone levels of said each of said at least one media content based on said tone level probabilities of said categories; and
      e. generates a report in response to a request from a client browser.

2. The web-based media analysis system recited in claim 1, wherein said meaningful minimum sections are words.

3. The web-based media analysis system recited in claim 1, wherein said toning engine further weighs tones of authors of said at least one media content for establishing said most probable tone level of said each of said at least one media content, wherein said tones of said authors of said at least one media content are established by retrieving, from said at least one database, tone level probabilities for the author of said each of said at least one media content, and determining most probable tone levels of said each of said at least one media content based on said tone level probabilities of said authors.

4. The web-based media analysis system recited in claim 3, wherein said authors are individuals or organizations.

5. The web-based media analysis system recited in claim 1, wherein said tone level probabilities for all of said serialized meaningful minimum sections, said tone level probabilities for said attributes of said each of said at least one media content, and said tone level probabilities for said categories of said each of said at least one media content are determined through training said toning engine by feeding a plurality of sample media contents with suggested tones thereof and updating said at least one database.

6. The web-based media analysis system recited in claim 5, wherein said training comprises the steps of:
   i. preparing said plurality of sample media contents with suggested tones thereof;
   ii. splitting each of said plurality of said sample media contents into meaningful minimum sections while filtering out any unessential sections and extracting attributes and categories of said each of said plurality of said sample media contents using regular expressions;
   iii. tracking number of appearances of each of said meaningful minimum sections in said each of said plurality of said sample media contents and associating said number of appearances and said suggested tone corresponding to said each of said plurality of said sample media contents, deriving said tone level probabilities of said each of said meaningful minimum sections cause said each of said plurality of said sample media contents to be toned at, and updating said at least one database with said tone level probabilities of said meaningful minimum sections;
   iv. deriving said tone level probabilities of said attributes of said each of said plurality of said sample media contents cause said each of said plurality of said sample media contents to be toned at, and updating said at least one database with said tone level probabilities of said attributes; and
   v. deriving said tone level probabilities of said categories of said each of said plurality of said sample media contents that cause said each of said plurality of said sample media contents to be toned at, and updating said at least one database with said tone level probabilities of said categories.

7. The web-based media analysis system recited in claim 6, wherein said meaningful minimum sections are words.

8. A computer-implemented method for managing and analyzing at least one media content comprising the steps of:

i. uploading said at least one media content from at least one content provider;
ii. converting each of said at least one media content into serialized data, filtering out unessential data from said serialized data according to a predefined list of unessential data, rationalizing nouns, pronouns and names therein, extracting attributes and categories of said each of said at least one media content, one or more quotes, and attributes of said one or more quotes in said each of said at least one media content using regular expressions, wherein said attributes of said one or more quotes comprise the name of the quoted person or organization;
iii. relationally storing and cross-referencing said serialized and filtered data and said extracted attributes and said categories of said each of said at least one media content, said one or more quotes, and said attributes of said one or more quotes into a plurality of tables in at least one database; and
iv. retrieving data from said plurality of tables in said at least one database in response to a request from a client browser and generating a report and toning said at least one media content prior to said generating said report by carrying out the process comprising the steps of:
  a. parsing each of said at least one media content and splitting into serialized meaningful minimum sections;
  b. retrieving, from said at least one database, tone level probabilities for each of said serialized meaningful minimum sections that cause said each of said at least one media content to be toned, and determining most probable tone levels of said each of said at least one media content based on said tone level probabilities of said serialized meaningful minimum sections;
  c. retrieving, from said at least one database, tone level probabilities for each of said attributes of said each of said at least one media content, and determining most probable tone levels of said each of said at least one media content based on said tone level probabilities of said attributes;
  d. retrieving, from said at least one database, tone level probabilities for each of said categories of said each of said at least one media content, and determining most probable tone levels of said each of said at least one media content based on said tone level probabilities of said categories; and
  e. establishing said most probable tone level of said each of at least one media content by weighing and ranking said most probable tone levels of said each of said at least one media content based on said tone level probabilities of said each of said serialized meaningful minimum sections, said most probable tone levels of said each of said at least one media content based on said tone level probabilities of said attributes, and said most probable tone levels of said each of said at least one media content based on said tone level probabilities of said categories.

9. The method for managing and analyzing said at least one media content recited in claim 8, wherein said meaningful minimum sections are words.

10. The method for managing and analyzing media contents recited in claim 8, wherein said toning engine further weighs tones of authors of said at least one media content for establishing said most probable tone level of said each of said at least one media content, wherein said tones of authors of said at least one media content are established by retrieving, from said at least one database, tone level probabilities for the author of said each of said at least one media content, and determining most probable tone levels of said each of said at least one media content based on said tone level probabilities of said authors.

11. The method for managing and analyzing said at least one media content recited in claim 10, wherein said authors are individuals or organizations.

12. The method for managing and analyzing said at least one media content recited in claim 8, wherein said tone level probabilities for all of said serialized meaningful minimum sections, said tone level probabilities for said attributes of said each of said at least one media content, and said tone level probabilities for said categories of said each of said at least one media content are determined through a training process by feeding a plurality of sample media contents with suggested tones thereof and updating said at least one database, wherein said training process comprises the steps of:
  i. splitting each of said plurality of said sample media contents into meaningful minimum sections while stripping out any unessential sections and extracting attributes and categories of said each of said plurality of said sample media contents using regular expressions;
  ii. tracking number of appearances of each of said meaningful minimum sections in said each of said plurality of said sample media contents and associating said number of appearances and said suggested tone corresponding to said each of said plurality of said sample media contents, deriving said tone level probabilities of said each of said meaningful minimum sections cause said each of said plurality of said sample media contents to be toned at, and updating said at least one database with said tone level probabilities of said meaningful minimum sections;
  iii. deriving said tone level probabilities of said attributes of said each of said plurality of said sample media contents cause said each of said plurality of said sample media contents to be toned at, and updating said at least one database with said tone level probabilities of said attributes; and
  iv. deriving said tone level probabilities of said categories of said each of said plurality of said sample media contents cause said each of said plurality of said sample media contents to be toned at, and updating said at least one database with said tone level probabilities of said categories.

13. The method for managing and analyzing said at least one media content recited in claim 12, wherein said meaningful minimum sections are words.

14. A tangible computer readable medium storing executable computer program instructions which, when executed at a server, cause the server to perform a process for analyzing at least one media content, the process comprising the steps of:
  i. unloading said at least one media content from at least one content provider over a communication network;
  ii. converting each of said at least one media content into serialized data, filtering out unessential data from said serialized data according to a predefined list of unessential data, extracting attributes and categories of said each of said at least one media content, and extracting, one or more quotes and attributes of said one or more quotes in said each of said at least one media content using regular expressions, wherein said attributes of said one or more quotes comprise the name of the quoted person or organization;
  iii. relationally storing and cross-referencing said serialized and filtered data, said extracted attributes, said extracted categories and said one or more quotes into a plurality of tables in at least one database;

iv. retrieving data from said plurality of said tables in said at least one database and generating a report in response to request from a user; and v. toning said at least one media content prior to said generating said report by carrying out the process steps of:

a. parsing each of said at least one media content and splitting into serialized meaningful minimum sections;

b. retrieving, from said at least one database, tone level probabilities for each of said serialized meaningful minimum sections that cause said each of said at least one media content to be toned at, and determining most probable tone levels of said each of said at least one media content based on said tone level probabilities of said serialized meaningful minimum sections;

c. retrieving, from said at least one database, tone level probabilities for each of said attributes of said media content, and determining most probable tone levels of said each of said at least one media content based on said tone level probabilities of said attributes;

d. retrieving, from said at least one database, tone level probabilities for each of said categories of said each of said at least one media content, and determining most probable tone levels of said each of said at least one media content based on said tone level probabilities of said categories; and e. establishing said most probable tone level of said each of said at least one media content by weighing and ranking said most probable tone levels of said each of said at least one media content based on said tone level probabilities of said each of said serialized meaningful minimum sections, said most probable tone levels of said each of said at least one media content based on said tone level probabilities of said attributes, and said most probable tone levels of said each of said at least one media content based on said tone level probabilities of said categories.

15. The computer readable medium recited in claim 14, wherein said meaningful minimum sections are words.

16. The computer readable medium recited in claim 15, wherein said toning engine further weighs tones of authors of said at least one media content for establishing said most probable tone level of said each of said at least one media content, wherein said tones of said authors of said at least one media content are established by retrieving, from said at least one database, tone level probabilities for the author of said each of said at least one media content, and determining most probable tone levels of said each of said at least one media content based on said tone level probabilities of said authors.

17. The computer readable medium recited in claim 16, wherein said authors are individuals or organizations.

18. The computer readable medium recited in claim 14, wherein said tone level probabilities for all of said serialized meaningful minimum sections, said tone level probabilities for said attributes of said each of said at least one media content, and said tone level probabilities for said categories of said each of said at least one media content are determined through a training process by feeding a plurality of sample media contents with suggested tones thereof and updating said at least one database, wherein said training process comprises the steps of:

i. splitting each of said plurality of said sample media contents into meaningful minimum sections while stripping out any unessential sections and extracting attributes and categories of said each of said plurality of said sample media contents using regular expressions;

ii. tracking number of appearances of each of said meaningful minimum sections in said each of said plurality of said sample media contents and associating said number of appearances and said suggested tone corresponding to said each of said plurality of said sample media contents, *deriving said tone level probabilities of said each of said meaningful minimum sections, and updating said at least one database with said tone level probabilities of said meaningful minimum sections;

iii. deriving said tone level probabilities of said attributes of said each of said plurality of said sample media contents cause said each of said plurality of said sample media contents to be toned at, and updating said at least one database with said tone level probabilities of said attributes; and iv. deriving said tone level probabilities of said categories of said each of said plurality of said sample media contents cause said each of said plurality of said sample media contents to be toned at, and updating said at least one database with said tone level probabilities of said categories.

19. The computer readable medium recited in claim 18, wherein said meaningful minimum sections are words.

20. A computer-implemented method of toning at least one media contents comprising the steps of:

i. parsing each of said at least one media content, splitting and serializing into meaningful minimum sections, and extracting attributes and categories of said each of said at least one media content, one or more quotes, and attributes of said one or more quotes in said each of said at least one media content;

ii. retrieving, from at least one database, tone level probabilities for each of said serialized meaningful minimum sections that cause said each of said at least one media content to be toned at, and determining most probable tone levels of said each of said at least one media content based on said tone level probabilities of said serialized meaningful minimum sections;

iii. retrieving, from said at least one database, tone level probabilities for each of said attributes of said each of said at least one media content, and determining most probable tone levels of said each of said at least one media content based on said tone level probabilities of said attributes;

iv. retrieving, from said at least one database, tone level probabilities for each of said categories of said each of said at least one media content, and determining most probable tone levels of said each of said at least one media content based on said tone level probabilities of said categories; and v. establishing said most probable tone level of said each of said at least one media content by weighing and ranking said most probable tone levels of said each of said at least one media content based on said tone level probabilities of said each of said serialized meaningful minimum sections, said most probable tone levels of said each of said at least one media content based on said tone level probabilities of said attributes, and said most probable tone levels of said each of said at least one media content based on said tone level probabilities of said categories.

21. The method of toning said at least one media content recited in claim 20, wherein said meaningful minimum sections are words.

22. The method of toning said at least one media content recited in claim 20, wherein said toning engine further weighs tones of authors of said at least one media content for establishing said most probable tone level of said each of said at least one media content, wherein said tones of said authors of said at least one media content are established by looking up from said at least one database probabilities of tone levels for the author of said each of said at least one media content, and determining most probable tone levels of said each of said at least one media content based on said tone level probabilities of said authors.

23. The method of toning said at least one media content recited in claim 22, wherein said authors are individuals or organizations.

24. The method of toning said at least one media content recited in claim 20, wherein said tone level probabilities for all of said serialized meaningful minimum sections, said tone level probabilities for said attributes of said each of said at least one media content, and said tone level probabilities for said categories of said each of said at least one media content are determined through a training process by feeding a plurality of sample media contents with suggested tones thereof and updating said at least one database, wherein said training process comprises the steps of:
  i. splitting each of said plurality of said sample media contents into meaningful minimum sections while stripping out any unessential sections and extracting attributes and categories of said each of said plurality of said sample media contents using regular expressions;
  ii. tracking number of appearances of each of said meaningful minimum sections in said each of said plurality of said sample media contents and associating said number of appearances and said suggested tone corresponding to said each of said plurality of said sample media contents for deriving probabilities of said each of said meaningful minimum sections cause said each of said plurality of said sample media contents to be toned at, and updating said at least one database with said tone level probabilities of said meaningful minimum sections;
  iii. deriving said tone level probabilities of said attributes of said each of said plurality of said sample media contents, and updating said at least one database with said tone level probabilities of said attributes; and
  iv. deriving said tone level probabilities of said categories of said each of said plurality of said sample media contents, and updating said at least one database with said tone level probabilities of said categories.

25. The method of toning said at least one media content recited in claim 24, wherein said meaningful minimum sections are words.

* * * * *